United States Patent
Liu et al.

(10) Patent No.: US 10,849,068 B2
(45) Date of Patent: Nov. 24, 2020

(54) TECHNIQUES AND APPARATUSES FOR WAKEUP SIGNAL DESIGN AND RESOURCE ALLOCATION

(71) Applicant: QUALCOMM Incorporated, San Diego, CA (US)

(72) Inventors: Le Liu, Fremont, CA (US); Alberto Rico Alvarino, San Diego, CA (US); Peter Pui Lok Ang, San Diego, CA (US); Mungal Singh Dhanda, Slough (GB)

(73) Assignee: QUALCOMM Incorporated, San Diego, CA (US)

(*) Notice: Subject to any disclaimer, the term of this patent is extended or adjusted under 35 U.S.C. 154(b) by 39 days.

(21) Appl. No.: 16/127,027

(22) Filed: Sep. 10, 2018

(65) Prior Publication Data

US 2019/0090190 A1  Mar. 21, 2019

Related U.S. Application Data

(60) Provisional application No. 62/559,331, filed on Sep. 15, 2017, provisional application No. 62/673,718, filed on May 18, 2018.

(51) Int. Cl.
*H04W 72/04* (2009.01)
*H04W 72/08* (2009.01)
*H04L 27/26* (2006.01)
*H04W 4/08* (2009.01)
(Continued)

(52) U.S. Cl.
CPC ....... *H04W 52/0229* (2013.01); *H04L 5/0053* (2013.01); *H04L 27/2613* (2013.01);
(Continued)

(58) Field of Classification Search
CPC ..... H04W 52/02; H04W 72/04; H04W 76/28; H04L 5/0051
See application file for complete search history.

(56) References Cited

U.S. PATENT DOCUMENTS

2010/0118836 A1* 5/2010 Kazmi ................ H04L 27/2618
                                                 370/336
2018/0249518 A1* 8/2018 Nguyen ................ H04W 76/14
(Continued)

OTHER PUBLICATIONS

Ericsson: "Wake-up Signaling in C-DRX," 3GPP Draft; R2-1704402—Wake-up Signaling in C-DRX, 3rd Generation Partnership Project (3GPP), Mobile Competence Centre; 650, Route Des Lucioles; F-06921 Sophia-Antipolis Cedex; France, vol. RAN WG2, No. Hangzhou; May 15, 2017-May 19, 2017, May 14, 2017, XP051274975, 4 pages, Retrieved from the Internet: URL: http://www.3gpp.org/ftp/Meetings_3GPP_SYNC/RAN2/Docs/ [retrieved on May 14, 2017].
(Continued)

*Primary Examiner* — Iqbal Zaidi
(74) *Attorney, Agent, or Firm* — Arent Fox LLP/Qualcomm Inc.; Nerrie M. Zohn

(57) ABSTRACT

Some techniques and apparatuses, described herein, provide for resource allocation to achieve frequency diversity, time diversity, and/or spatial diversity for wakeup signals destined to two or more UE groups by transmitting the wakeup signals according to respective resource patterns associated with the two or more UE groups. Additionally, some techniques and apparatuses described herein provide for resource allocation to achieve spatial diversity for wakeup signals for a single UE group by transmitting the wakeup signals using two or more antenna ports according to respective resource patterns associated with the two or more antenna ports. Furthermore, some techniques and apparatuses described herein provide configurations for wakeup signals based at least in part on delays or gaps, repetitious communications, synchronization in accordance with a power level of the wakeup signal, and the like.

46 Claims, 19 Drawing Sheets

(51) Int. Cl.
    *H04L 1/18*     (2006.01)
    *H04W 52/02*     (2009.01)
    *H04L 5/00*     (2006.01)
    *H04W 28/02*     (2009.01)
    *H04W 56/00*     (2009.01)

(52) U.S. Cl.
    CPC ......... *H04W 4/08* (2013.01); *H04W 28/0215* (2013.01); *H04W 52/0235* (2013.01); *H04W 56/0045* (2013.01); *H04W 72/048* (2013.01); *H04W 72/0446* (2013.01); *H04W 72/08* (2013.01); *H04L 1/18* (2013.01); *H04L 27/2692* (2013.01)

(56) References Cited

U.S. PATENT DOCUMENTS

2019/0090191 A1     3/2019     Liu et al.
2019/0254110 A1*     8/2019     He ......................... H04L 5/0048

OTHER PUBLICATIONS

International Search Report and Written Opinion—PCT/US2018/050478—ISA/EPO—dated Nov. 20, 2018.

Qualcomm Incorporated: "Efficient Monitoring of DL Control Channels," 3GPP Draft; R1-1712806 Efficient Monitoring of DL Control Channels, 3rd Generation Partnership Project (3GPP), Mobile Competence Centre; 650, Route Des Lucioles; F-06921 Sophia-Antipolis Cedex; FRA, vol. RAN WG1, No. Prague, Czechia; Aug. 21, 2017-Aug. 25, 2017, Aug. 20, 2017, XP051315618, 12 pages, Retrieved from the Internet: URL: http://www.3gpp.org/ftp/Meetings_3GPP_SYNC/RAN1/Docs/ [retrieved on Aug. 20, 2017].

Qualcomm Incorporated, et al., "Wake-up Signaling for C-DRX Mode," 3GPP Draft; R2-1709652 Wake-up Signaling for C-DRX Mode, 3rd Generation Partnership Project (3GPP), Mobile Competence Centre; 650, Route Des Lucioles; F-06921, Sophia-Antipolis Cedex; France, vol. RAN WG2, No. Berlin, Germany; Aug. 21, 2017-Aug. 25, 2017, Aug. 20, 2017, XP051319364, 6 pages, Retrieved from the Internet: URL: http://www.3gpp.org/ftp/Meetings_3GPP_SYNC/RAN2/Docs/ [retrieved on Aug. 20, 2017].

Qualcomm Incorporated: "WF on Evaluation for Wake-Up Signal", 3GPP Draft; R1-1700821_WUS, 3rd Generation Partnership Project (3GPP), Mobile Competence Centre; 650, Route Des Lucioles; F-06921 Sophia-Antipolis Cedex; France, vol. RAN WG1, No. Spokane, U.S.A; Jan. 16, 2017-Jan. 20, 2017, Jan. 10, 2017 (Jan. 10, 2017), pp. 1-3, XP051203134, Retrieved from the Internet: URL: http://www.3gpp.org/ftp/tsg_ran/WG1_RL1/TSGR1_AH/NR_AH_1701/Docs/ [retrieved on Jan. 10, 2017].

* cited by examiner

TDM/antenna port transmission resource pattern 305-2

| SF 0 | SF 1 | SF 2 | SF 3 | SF 4 | SF 5 | SF 6 | SF 7 | SF 8 | SF 9 |
|------|------|------|------|------|------|------|------|------|------|
| NPBCH | WUS1 | WUS1 | WUS1 | SIB1 | NPSS | WUS2 | WUS2 | WUS2 | NSSS |

300

TDM/antenna port transmission resource pattern 305-3

| SF 0 | SF 1 | SF 2 | SF 3 | SF 4 | SF 5 | SF 6 | SF 7 | SF 8 | SF 9 |
|---|---|---|---|---|---|---|---|---|---|
| NPBCH | WUS1 | WUS1 | WUS1 | SIB1 | NPSS | WUS1 | WUS1 | WUS1 | NSSS |

310

| SF 0 | SF 1 | SF 2 | SF 3 | SF 4 | SF 5 | SF 6 | SF 7 | SF 8 | SF 9 |
|---|---|---|---|---|---|---|---|---|---|
| NPBCH | WUS2 | WUS2 | WUS2 | SIB1 | NPSS | WUS2 | WUS2 | WUS2 | NSSS |

TECHNIQUES AND APPARATUSES FOR WAKEUP SIGNAL DESIGN AND RESOURCE ALLOCATION

CROSS-REFERENCE TO RELATED APPLICATIONS UNDER 35 U.S.C. § 119

This application claims priority to U.S. Provisional Patent Application No. 62/559,331, filed on Sep. 15, 2017, entitled "TECHNIQUES AND APPARATUSES FOR WAKEUP SIGNAL DESIGN AND RESOURCE ALLOCATION," and U.S. Provisional Patent Application No. 62/673,718, filed on May 18, 2018, entitled "TECHNIQUES AND APPARATUSES FOR WAKEUP SIGNAL DESIGN AND RESOURCE ALLOCATION," which are hereby expressly incorporated by reference herein.

BACKGROUND

Field

Aspects of the present disclosure generally relate to wireless communication, and more particularly to techniques and apparatuses for wakeup signal design and resource allocation.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A UE may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a 5G BS, a 5G Node B, and/or the like.

The above multiple access technologies have been adopted in various telecommunication standards to provide a common protocol that enables different wireless communication devices to communicate on a municipal, national, regional, and even global level. 5G, which may also be referred to as New radio (NR), is a set of enhancements to the LTE mobile standard promulgated by the Third Generation Partnership Project (3GPP). 5G is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and 5G technologies. Preferably, these improvements should be applicable to other multiple access technologies and the telecommunication standards that employ these technologies.

A BS may transmit a signal to a UE to indicate whether the UE should decode a subsequent communication (e.g., a downlink channel). This may improve battery efficiency of the UE because the UE may not monitor for the subsequent communication unless the UE receives the signal. For example, such a signal may be termed a wakeup signal. In some cases, a wakeup signal may apply to multiple UEs. For example, by assigning UEs to two or more UE groups, all UEs of a UE group can be awakened using a single wakeup signal. This may be more efficient than transmitting a wakeup signal to a single UE, and may be more efficient than waking up all UEs (instead of only a group of UEs) for the subsequent communication. It may be beneficial to achieve diversity (e.g., frequency diversity, time diversity, and/or spatial diversity) for wakeup signals that are destined to different UE groups.

SUMMARY

Some techniques and apparatuses, described herein, provide for resource allocation to achieve frequency diversity, time diversity, and/or spatial diversity for wakeup signals destined to two or more UE groups by transmitting the wakeup signals according to respective resource patterns associated with the two or more UE groups. For example, a UE associated with a particular UE group may identify a wakeup signal for the particular UE group based at least in part on which resource pattern is used for the particular UE group, based at least in part on a preamble of the wakeup signal, and/or the like. Additionally, some techniques and apparatuses described herein provide for resource allocation to achieve spatial diversity for wakeup signals for a single UE group by transmitting the wakeup signals using two or more antenna ports according to respective resource patterns associated with the two or more antenna ports. In this way, UE group wakeup signaling is providing using respective resource patterns, which improves diversity and allows wakeup signaling for UE groups, thereby conserving network resources that would otherwise be used to wakeup signal multiple individual UEs.

Furthermore, some techniques and apparatuses described herein provide configurations for wakeup signals. For example, some techniques and apparatuses described herein provide for transmission of wakeup signals after a configured delay that may be based at least in part on capabilities of the UE. As another example, some techniques and apparatuses described herein provide for resource allocation for a wakeup signal pertaining to a repetitious communication so that UEs, which cannot decode the repetitions communication, are not awakened. In this way, configuration of wakeup signals is improved, efficiency of UEs and UE groups is improved with regard to wakeup signaling, and diversity of wakeup signaling is improved.

In an aspect of the disclosure, a method performed by a base station, a method performed by a user equipment, an apparatus, a base station, a user equipment, and a computer program product are provided.

In some aspects, the method performed by the base station may include transmitting a wakeup signal using a resource selected from one of one or more first resources of a first resource pattern, or one or more second resources of a second resource pattern, wherein the resource is selected from the one or more first resources or the one or more second resources based at least in part on whether the wakeup signal is for a user equipment (UE) associated with a first UE group or a second UE group; and/or transmitting a communication to the UE based at least in part on the wakeup signal.

In some aspects, the base station may include a memory and one or more processors operatively coupled to the memory. The memory and the one or more processors may be configured to transmit a wakeup signal using a resource selected from one of one or more first resources of a first resource pattern, or one or more second resources of a second resource pattern, wherein the resource is selected from the one or more first resources or the one or more second resources based at least in part on whether the wakeup signal is for a UE associated with a first UE group or a second UE group; and/or transmit a communication to the UE based at least in part on the wakeup signal.

In some aspects, the apparatus may include means for transmitting a wakeup signal using a resource selected from one of one or more first resources of a first resource pattern, or one or more second resources of a second resource pattern, wherein the resource is selected from the one or more first resources or the one or more second resources based at least in part on whether the wakeup signal is for a UE associated with a first UE group or a second UE group; and/or means for transmitting a communication to the UE based at least in part on the wakeup signal.

In some aspects, the computer program product may include a non-transitory computer-readable medium storing one or more instructions for wireless communication that, when executed by one or more processors, cause the one or more processors to transmit a wakeup signal using a resource selected from one of one or more first resources of a first resource pattern, or one or more second resources of a second resource pattern, wherein the resource is selected from the one or more first resources or the one or more second resources based at least in part on whether the wakeup signal is for a UE associated with a first UE group or a second UE group; and transmit a communication to the UE based at least in part on the wakeup signal.

In some aspects, the method performed by the user equipment may include monitoring a particular resource of a resource pattern for wakeup signaling associated with a UE group that includes the UE, wherein the resource pattern is associated with the UE group; and receiving a wakeup signal, wherein the wakeup signal corresponds to at least one of a cell identifier or UE group identifier associated with the UE, wherein at least a portion of the cell identifier or a portion of the UE group identifier is indicated by the wakeup signal.

In some aspects, the user equipment may include a memory and one or more processors operatively coupled to the memory. The memory and the one or more processors may be configured to monitor a particular resource of a resource pattern for wakeup signaling associated with a UE group that includes the UE, wherein the resource pattern is associated with the UE group; and receive a wakeup signal, wherein the wakeup signal corresponds to at least one of a cell identifier or UE group identifier associated with the UE, wherein at least a portion of the cell identifier or a portion of the UE group identifier is indicated by the wakeup signal.

In some aspects, the apparatus may include means for monitoring a particular resource of a resource pattern for wakeup signaling associated with a UE group that includes the apparatus, wherein the resource pattern is associated with the UE group; and receiving a wakeup signal, wherein the wakeup signal corresponds to at least one of a cell identifier or UE group identifier associated with the apparatus, wherein at least a portion of the cell identifier or a portion of the UE group identifier is indicated by the wakeup signal.

In some aspects, the computer program product may include a non-transitory computer-readable medium storing one or more instructions for wireless communication that, when executed by one or more processors, cause the one or more processors to monitor a particular resource of a resource pattern for wakeup signaling associated with a UE group that includes the UE, wherein the resource pattern is associated with the UE group; and receive a wakeup signal, wherein the wakeup signal corresponds to at least one of a cell identifier or UE group identifier associated with the UE, wherein at least a portion of the cell identifier or a portion of the UE group identifier is indicated by the wakeup signal.

In some aspects, the method performed by the base station may include determining a configuration for a wakeup signal associated with a user equipment (UE); transmitting the wakeup signal in a resource based at least in part on the configuration; and transmitting a communication to the UE based at least in part on the wakeup signal.

In some aspects, the base station may include a memory and one or more processor operatively coupled to the memory. The memory and the one or more processors may be configured to determine a configuration for a wakeup signal associated with a user equipment (UE); transmit the wakeup signal in a resource based at least in part on the configuration; and transmit a communication to the UE based at least in part on the wakeup signal.

In some aspects, the apparatus may include means for determining a configuration for a wakeup signal associated with a user equipment (UE); means for transmitting the wakeup signal in a resource based at least in part on the configuration; and means for transmitting a communication to the UE based at least in part on the wakeup signal.

In some aspects, the computer program product may include a non-transitory computer-readable medium storing one or more instructions for wireless communication that, when executed by one or more processors, cause the one or more processors to determine a configuration for a wakeup signal associated with a user equipment (UE); transmit the wakeup signal in a resource based at least in part on the configuration; and transmit a communication to the UE based at least in part on the wakeup signal.

In some aspects, the method performed by the user equipment (UE) may include monitoring for wakeup signaling in a resource based at least in part on a wakeup signal configuration, wherein the wakeup signal configuration is based at least in part on a capability of the UE; receiving a wakeup signal in the resource; and receiving a communication based at least in part on the wakeup signal.

In some aspects, the UE may include a memory and one or more processor operatively coupled to the memory. The memory and the one or more processors may be configured to monitor for wakeup signaling in a resource based at least in part on a wakeup signal configuration, wherein the wakeup signal configuration is based at least in part on a capability of the UE; receive a wakeup signal in the resource; and receive a communication based at least in part on the wakeup signal.

In some aspects, the apparatus may include means for monitoring for wakeup signaling in a resource based at least in part on a wakeup signal configuration, wherein the wakeup signal configuration is based at least in part on a capability of the apparatus; means for receiving a wakeup signal in the resource; and means for receiving a communication based at least in part on the wakeup signal.

In some aspects, the computer program product may include a non-transitory computer-readable medium storing one or more instructions for wireless communication that, when executed by one or more processors of a UE, cause the one or more processors to monitor for wakeup signaling in a resource based at least in part on a wakeup signal configuration, wherein the wakeup signal configuration is based at least in part on a capability of the UE; receive a wakeup signal in the resource; and receive a communication based at least in part on the wakeup signal.

Aspects generally include a method, apparatus, system, computer program product, non-transitory computer-readable medium, base station, user equipment, wireless communication device, and processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

FIGS. 3A-3C are diagrams illustrating examples of time division multiplexed (TDM) and/or antenna port patterns for wakeup signal transmission.

DETAILED DESCRIPTION

Figure 1:
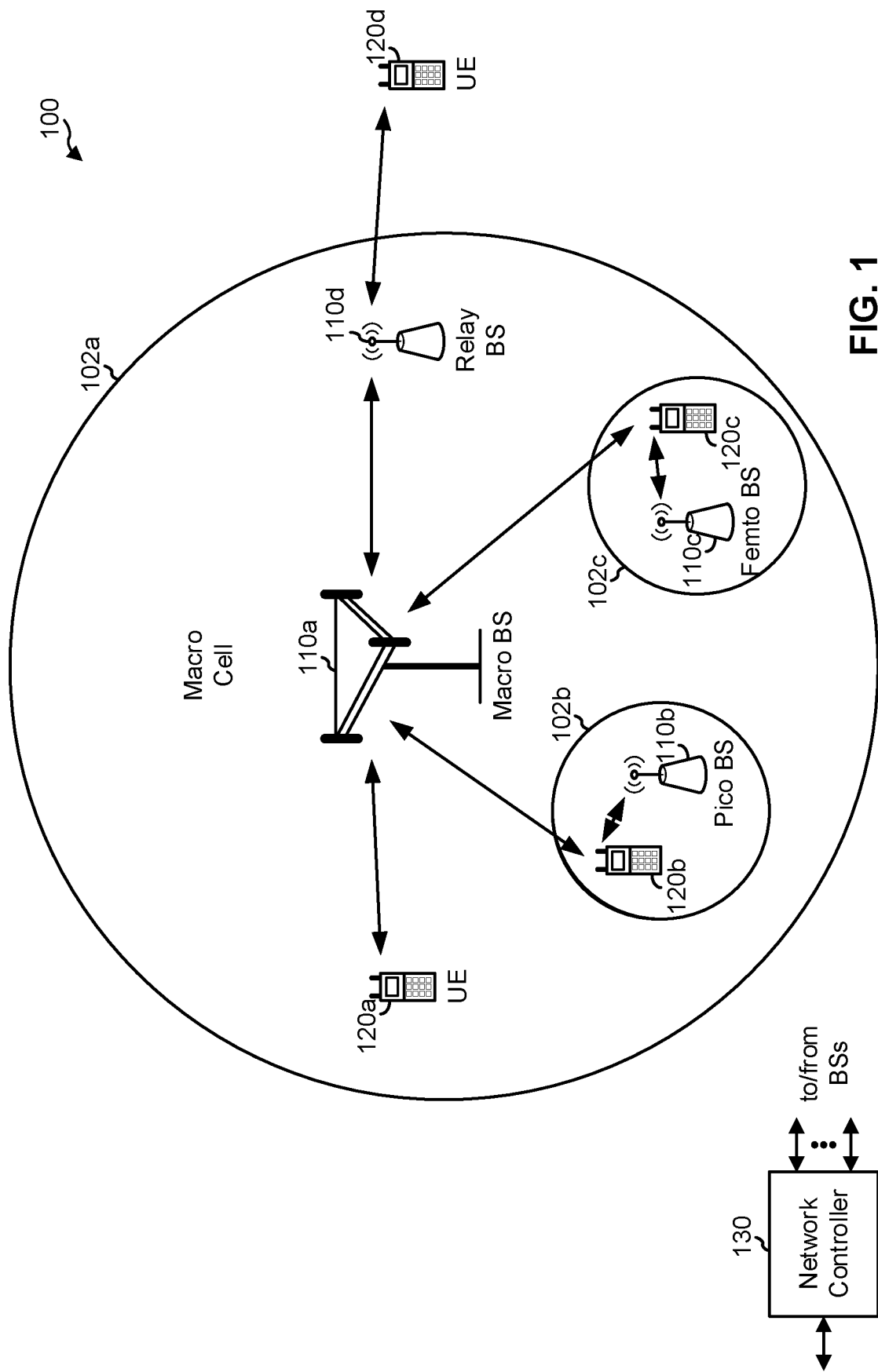
FIG. 1 is diagram illustrating an example of a wireless communication network.

The detailed description set forth below in connection with the appended drawings is intended as a description of various configurations and is not intended to represent the configurations in which the concepts described herein may be practiced. The detailed description includes specific details for the purposes of providing a thorough understanding of various concepts. However, it will be apparent to those skilled in the art that these concepts may be practiced without these specific details. In some instances, well-known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, and/or the like (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, and/or the like, whether referred to as software, firmware, middleware, microcode, hardware description language, or otherwise.

Accordingly, in one or more example embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, combinations of the aforementioned types of computer-readable media, or any other medium that can be used to store computer executable code in the form of instructions or data structures that can be accessed by a computer.

It is noted that while aspects may be described herein using terminology commonly associated with 3G and/or 4G wireless technologies, aspects of the present disclosure can be applied in other generation-based communication systems, such as 5G and later, including 5G technologies.

FIG. 1 is a diagram illustrating a network 100 in which aspects of the present disclosure may be practiced. The network 100 may be an LTE network or some other wireless network, such as a 5G network. Wireless network 100 may include a number of BSs 110 (shown as BS 110a, BS 110b, BS 110c, and BS 110d) and other network entities. A BS is an entity that communicates with user equipment (UEs) and may also be referred to as a base station, a 5G BS, a Node B, a gNB, a 5G NB, an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "5G BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another and/or to one or more other BSs or network nodes (not shown) in the access network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, etc. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as may be implemented as NB-IoT (narrowband internet of things) devices. Some UEs may be considered a Customer Premises Equipment (CPE). A UE 120 such as an NB-IoT or eMTC UE 120 may remain in a dormant or idle state until a wakeup signal is received. The wakeup signal may indicate that a communication is scheduled for the UE 120. In some aspects, described elsewhere herein, UEs 120 may be grouped into UE groups, which may increase the efficiency of use of the wakeup signal.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, 5G RAT networks may be deployed.

In some examples, access to the air interface may be scheduled, wherein a scheduling entity (e.g., a base station) allocates resources for communication among some or all devices and equipment within the scheduling entity's service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As indicated above, FIG. 1 is provided merely as an example. Other examples are possible and may differ from what was described with regard to FIG. 1.

Figure 2:
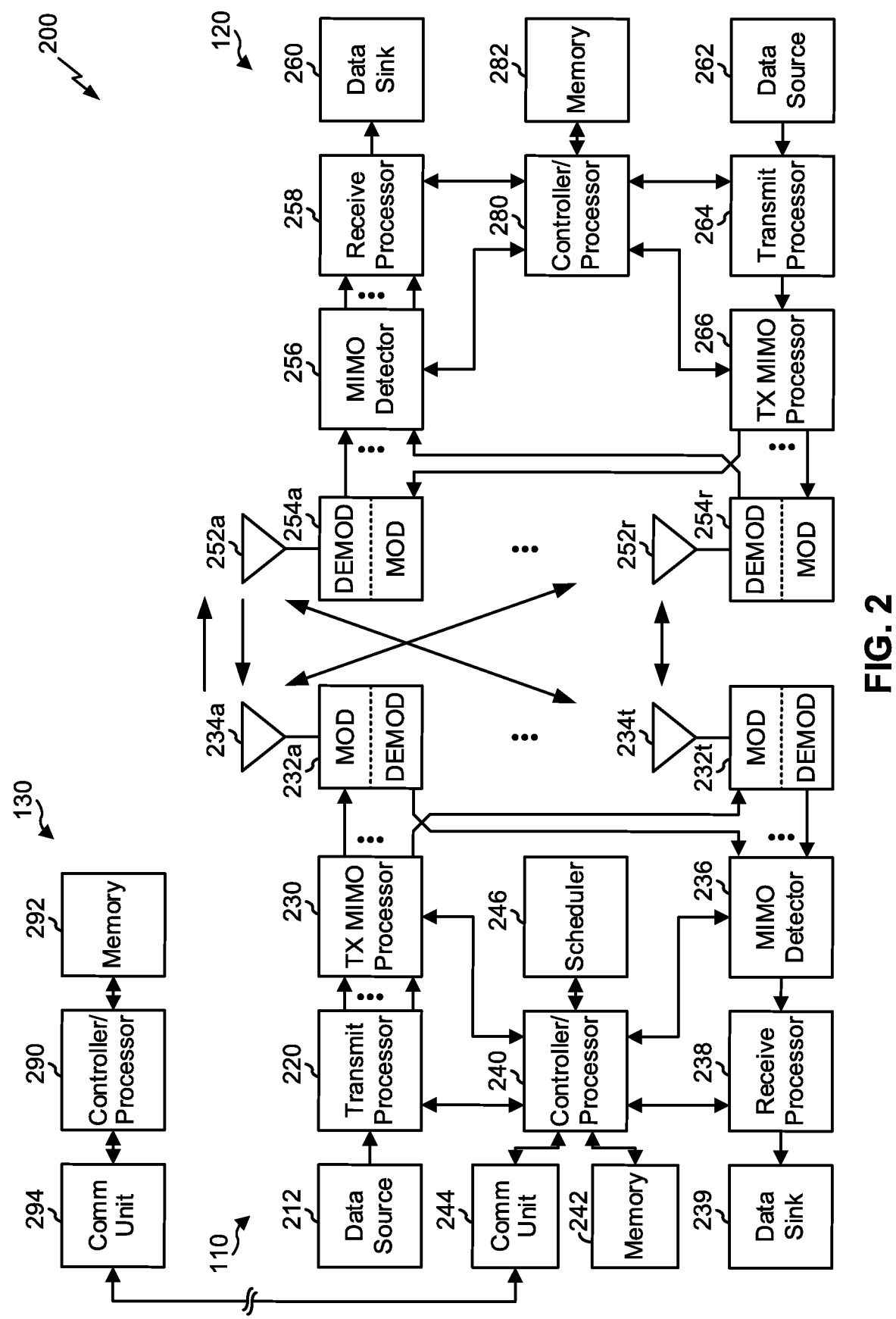
FIG. 2 is a diagram illustrating an example of a base station in communication with a UE in a wireless communication network.

FIG. 2 shows a block diagram 200 of a design of BS 110 and UE 120, which may be one of the base stations and one of the UEs in FIG. 1. BS 110 may be equipped with T antennas 234a through 234t, and UE 120 may be equipped with R antennas 252a through 252r, where in general T≥1 and R≥1.

At BS 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI), and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS), the narrowband reference signal (NRS)) and synchronization signals (e.g., the primary synchronization signal (PSS) and secondary synchronization signal (SSS), the narrowband PSS (NPSS) and narrowband SSS (NSSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to certain aspects described in more detail below, the synchronization signals can be generated with location encoding to convey additional information.

At UE 120, antennas 252a through 252r may receive the downlink signals from BS 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive (RX) processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, the channel processor may determine a reference value based at least in part on a wakeup signal, as described elsewhere herein.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to BS 110. At BS 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. BS 110 may include communication unit 244 and communicate to network controller 130 via communication unit 244. Network controller 130 may include communication unit 294, controller/processor 290, and memory 292.

Controller/processor 240 of BS 110, controller/processor 280 of UE 120, and/or any other component(s) of FIG. 2 may perform signaling related to wakeup signal resource allocation. For example, controller/processor 240 of BS 110, controller/processor 280 of UE 120, and/or any other component(s) of FIG. 2 may perform or direct operations of, for example, method 500 of FIG. 5, method 600 of FIG. 6, method 1200 of FIG. 12, method 1300 of FIG. 13, and/or other processes as described herein. Memories 242 and 282 may store data and program codes for BS 110 and UE 120, respectively. A scheduler 246 may schedule UEs for data transmission on the downlink and/or uplink.

As indicated above, FIG. 2 is provided merely as an example. Other examples are possible and may differ from what was described with regard to FIG. 2.

UE Group Wakeup Signal Resource Allocations

Figure 3A:
Figure 3B:

FIGS. 3A-3C are diagrams illustrating examples 300 of TDM and/or antenna port patterns for wakeup signal transmission. In FIGS. 3A-3C, two UE groups are described, and each UE group is associated with a respective resource pattern. Resources belonging to a first resource pattern are shown as WUS1 (meaning wakeup signal 1), and resources belonging to a second resource pattern are shown as WUS2 (meaning wakeup signal 2). In some aspects, a resource pattern may correspond to a single UE group. Additionally, or alternatively, a resource pattern may correspond to an antenna port for transmission of wakeup signals, as described in more detail below. Furthermore, in FIGS. 3A-3C, subframe (SF) 0 is used for a physical broadcast channel, SF 4 is used for a system information block (e.g., SIB1), SF 5 is used for a primary synchronization signal (NPSS), and SF 9 is used for a secondary synchronization signal (NSSS), although other configurations are possible. In some aspects, the wakeup signal resources may be associated with a plurality of resource patterns (e.g., three resource patterns, five resource patterns, or any number of resource patterns).

As shown by reference number 305-1, FIG. 3A shows a first example of a TDM pattern and/or an antenna port transmission resource pattern. In the first example, resources of the first resource pattern alternate with resources of the second resource pattern. For example, WUS1 may be transmitted on subframes (SFs) 1, 3, and 7, whereas WUS2 may be transmitted on subframes 2, 6, and 8. In this way, time diversity of wakeup signals for the first UE group and the second UE group is achieved. In some aspects, WUS1 and/or WUS2 may be transmitted using a same antenna port as the NPSS, the NSSS, and/or a reference signal (e.g., an NRS and/or the like) (e.g., within at least a single subframe), which reduces delay associated with retuning a receiver of the UE 120.

Additionally, or alternatively, WUS1 may be transmitted using a first antenna port of BS 110, and WUS2 may be transmitted using a second antenna port of BS 110. In such a case, WUS1 and WUS2 may be associated with the same UE group, and the designation of resources as WUS1 or WUS2 may indicate which antenna port is to be used to transmit the wakeup signal in the corresponding resources. Thus, spatial diversity of wakeup signals for the first UE group and the second UE group is achieved.

As shown in FIG. 3B, a second resource pattern 305-2 may transmit WUS1 during subframes 1, 2, and 3, and may transmit WUS2 during subframes 6, 7, and 8. This may provide a larger number of simultaneous repetitions of the wakeup signal, which may increase a likelihood of successful reception of the wakeup signal for UEs 120 that require multiple repetitions of the wakeup signal. Additionally, or alternatively, BS 110 may transmit WUS1 using a first antenna port in subframes 1, 2, and 3, and may transmit WUS2 using a second antenna port in subframes 6, 7, and 8. In such a case, WUS1 and WUS2 may be associated with a same UE group.

As shown in FIG. 3C, a third resource pattern 305-3 may transmit WUS1 in a first frame 310 (e.g., subframes 1, 2, 3, 6, 7, and 8 of the first frame 310), and may transmit WUS2 in a second frame 315 (e.g., subframes 1, 2, 3, 6, 7, and 8 of the second frame 315). For example, the first frame 310 and the second frame 315 may be consecutive frames. This may further increase a likelihood of reception of the wakeup signal for UEs that use multiple repetitions.

In some aspects, a number of wakeup signals of a resource pattern may be configurable. For example, the BS 110 may specify any number of wakeup signals to be included in the resource patterns of WUS1 and/or WUS2. In this way, versatility of wakeup signaling is improved, and resources may be more efficiently allocated.

In some aspects, for a single wakeup signal (e.g., a single WUS1 or a single WUS2), two or more different antenna ports may be used within a single subframe. For example, a first subset of symbols of the single wakeup signal may be transmitted from a first antenna port, and a second subset of symbols of the single wakeup signal may be transmitted from a second antenna port, thereby improving spatial diversity.

In some aspects, a UE 120 may scan or monitor for the wakeup signals. "Scan" is used interchangeably with "monitor" herein. The UE 120 may identify or receive a wakeup signal based at least in part on a preamble of the wakeup signal. For example, the BS 110 may encode the preamble to identify at least a portion of a cell identifier of a camping cell or serving cell associated with the UE 120. Additionally, the BS 110 may encode the preamble to identify at least a portion of a UE group identifier that identifies a UE group of the UE 120. In some aspects, the UE 120 may determine that a wakeup signal is relevant to the UE 120 when the cell identifier and the UE group identifier respectively match a cell identifier and UE group identifier of the UE 120. In some aspects, the UE 120 may determine that a wakeup signal is relevant to the UE 120 when the cell identifier matches a cell identifier of the UE 120. In some aspects, the UE 120 may determine that a wakeup signal is relevant to the UE 120 when the UE group identifier matches a UE group identifier of the UE 120.

In some aspects, the BS 110 may select a resource for transmission of a wakeup signal based at least in part on a UE group identifier and/or a paging narrowband of a UE 120. For example, the BS 110 may determine the resource using the following equations 1 through 4:

$$\text{SFN mod } T = (T \text{ div } N) * (\text{UE\_ID mod } N) \quad \text{Equation 1:}$$

$$i\_s = \text{floor}(\text{UE\_ID}/N) \text{ mod } Ns \quad \text{Equation 2:}$$

$$\text{PNB} = \text{floor}(\text{UE\_ID}/(N*Ns)) \text{ mod } Nn \quad \text{Equation 3:}$$

$$\text{UE\_Group\_ID} = \text{floor}(\text{UE\_ID}/(N*Ns*Nn)) \text{ mod } N\_\text{WUS\_Groups} \quad \text{Equation 4:}$$

Equation 1 is used to identify a paging frame (e.g., system frame number (SFN) mod T) for the UE 120, wherein T refers to a discontinuous reception (DRX) cycle, N is a minimum value of T and an nB value configured in SIB2, and UE_ID is a UE identifier of the UE 120. Equation 2 identifies a paging occasion (PO) of the UE 120 based at least in part on UE_ID, N, and Ns. Ns is a maximum value of 1 and nB.

Equation 3 identifies a paging narrowband (PNB) of the UE 120 based at least in part on the UE_ID, N, Ns, and Nn, wherein Nn identifies a number of available narrowbands. Equation 4 identifies a UE group identifier (UE_Group_ID) of the UE 120 based at least in part on the paging narrowband, wherein N_WUS_Groups identifies a total number of UE groups. In this way, BS 110 and/or UE 120 can determine a UE group of the UE 120 based at least in part on a paging narrowband of the UE 120.

In some aspects, the BS 110 may provide information to a UE 120 indicating parameters of a preamble, and the UE 120 may identify or receive a relevant wakeup signal based at least in part on the parameters. In such a case, the configuration of the UE 120 may be transparent. For example, the UE 120 may not know the particular UE group identifier and/or cell identifier included in the preamble, and may search for any preamble that matches the parameters.

As indicated above, FIGS. 3A-3C are provided as examples. Other examples are possible and may differ from what was described with respect to FIGS. 3A-3C.

Figure 4:
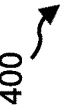
FIG. 4 is a diagram illustrating an example of frequency division multiplexing (FDM) patterns for wakeup signal transmission.

FIG. 4 is a diagram illustrating an example 400 of FDM patterns for wakeup signal transmission. In some aspects, such as the enhanced Machine Type Communications (eMTC) radio access technology, FDM may be used. For example, and as shown in FIG. 4, a set of resources 405, 410, 415, 420 for eMTC communication may include six physical resource blocks (PRBs) that are parallel in frequency. For example, the six PRBs may be associated with a single subframe or frame.

As shown by reference number 405, in some aspects, resources of the resource pattern shown by WUS1 may alternate with resources of the resource pattern shown by WUS2. This may improve frequency diversity of the wakeup signals.

As shown by reference number 410, in some aspects, multiple resources of the resource pattern shown by WUS1 may be allocated contiguously in frequency, and multiple resources of the resource pattern shown by WUS2 may be allocated contiguously in frequency. In this way, UEs that use multiple repetitions may be able to decode the wakeup signal.

As shown by reference number 415 and 420, in some aspects, a full bandwidth of a first frame or subframe may be allocated for WUS1, and a full bandwidth of a second frame or subframe may be allocated for WUS2. In this way, a likelihood of decoding of the wakeup signal for UEs that require multiple repetitions may be further improved.

In some aspects, resources may be allocated for the wakeup signals using a frequency hopping technique. For example, the BS 110 may configure, for a UE 120, a starting subframe index, a frequency offset, and/or a hopping time for frequency hopping. The BS 110 may allocate resources for transmission of the wakeup signal according to the starting subframe index, the frequency offset, and/or the hopping time.

As indicated above, FIG. 4 is provided as an example. Other examples are possible and may differ from what was described with respect to FIG. 4.

Figure 5:
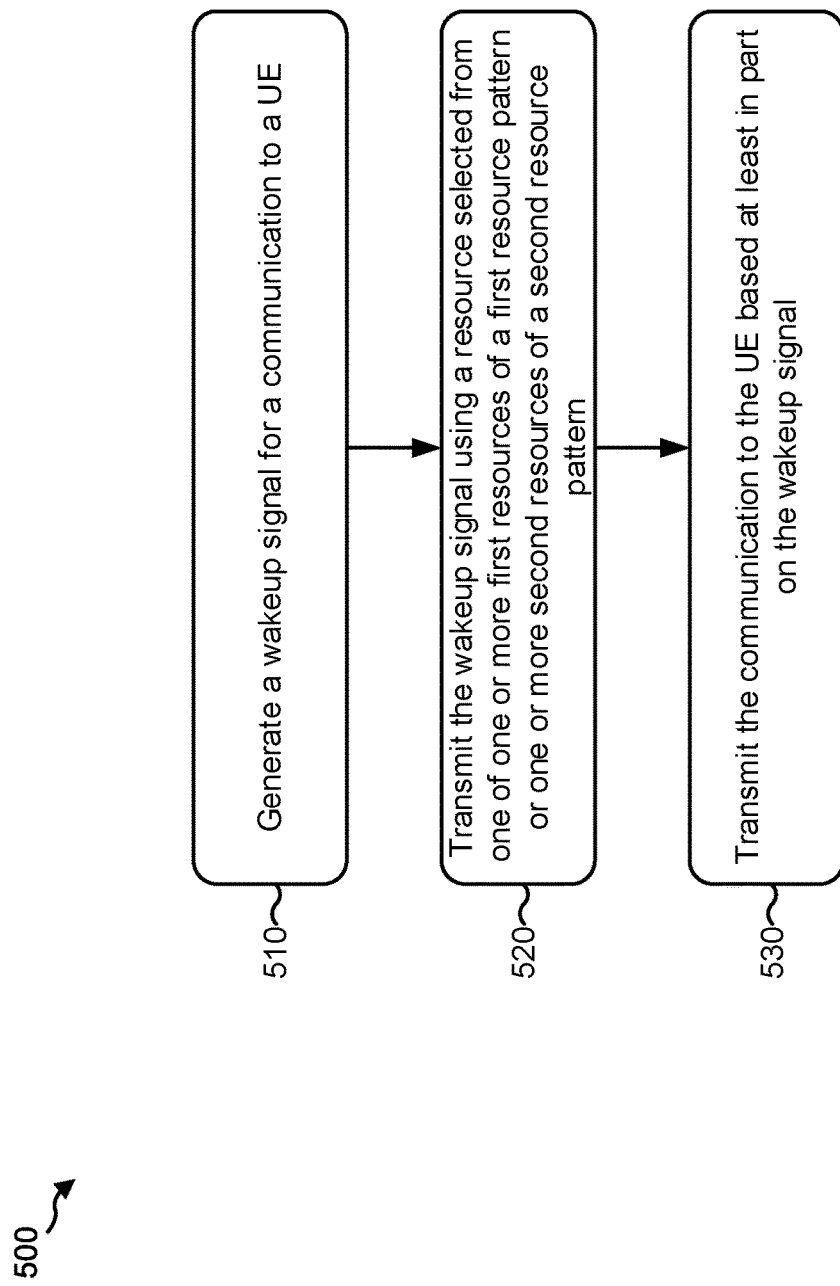
FIG. 5 is a flow chart of a method of wireless communication.

FIG. 5 is a flow chart of a method 500 of wireless communication. The method may be performed by a base station (e.g., the BS 110 of FIG. 1, apparatus 702/702', and/or the like).

At 510, the base station may (e.g., using controller/processor 240, transmit processor 220, TX MIMO processor 230, MOD 232, antenna 234, and/or the like) generate a wakeup signal for a communication to a UE. For example, the wakeup signal may include a preamble identifying a UE group of the UE and/or a cell identifier of a cell of the UE. The base station may provide the wakeup signal to cause the UE to wake up or exit an idle or dormant mode to receive the communication.

At 520, the base station (e.g., using controller/processor 240, transmit processor 220, TX MIMO processor 230, MOD 232, antenna 234, and/or the like) may transmit the wakeup signal using a resource selected from one or more first resources of a first resource pattern or one or more second resources of a second resource pattern. For example, the first resource pattern may be associated with a first UE group, and the second resource pattern may be associated with a second UE group. The base station may select the resource, of the one or more first resources or the one or more second resources, based at least in part on whether the wakeup signal is to be transmitted to the first UE group or the second UE group.

In some aspects, the one or more first resources alternate with the one or more second resources in a time domain. In some aspects, the one or more first resources are in a first set of subframes and the one or more second resources are in a second set of subframes. In some aspects, the first resource pattern is associated with a first antenna port and the second resource pattern is associated with a second antenna port. In some aspects, the wakeup signal is transmitted using a same antenna port as a synchronization signal or reference signal for the UE. In some aspects, the wakeup signal is transmitted using a different antenna port than a synchronization signal or reference signal for the UE.

In some aspects, the wakeup signal is transmitted using two or more antenna ports within a single subframe. In some aspects, the wakeup signal is transmitted using a same antenna port within at least a single subframe. In some aspects, a number of the one or more first resources or a number of the one or more second resources is configurable or predefined. In some aspects, the one or more first resources and the one or more second resources comprise physical resource blocks (PRBs). In some aspects, the one or more first resources alternate with the one or more second resources in a frequency domain. In some aspects, resources of the one or more first resources or the one or more second resources vary in a time domain and a frequency domain.

In some aspects, a preamble of the wakeup signal identifies a UE group, of the first UE group and the second UE group, with which the wakeup signal is associated. In some aspects, a preamble of the wakeup signal identifies a cell with which the UE is associated.

In some aspects, configuration information identifying the first UE group and the second UE group is provided in system information. In some aspects, a transmission power of the wakeup signal is configured based at least in part on a power offset relative to a downlink reference signal transmitted by the base station. In some aspects, a UE group, of the first UE group and the second UE group, is assigned to the UE based at least in part on a paging narrowband of the UE.

In some aspects, the wakeup signal is identified further based at least in part on a parameter of a preamble of the wakeup signal, wherein the UE is configured to detect the parameter of the preamble.

At 530, the base station (e.g., using controller/processor 240, transmit processor 220, TX MIMO processor 230, MOD 232, antenna 234, and/or the like) may transmit a communication to a UE based at least in part on the wakeup signal. For example, the communication may include a downlink channel. The base station may transmit the communication to the UE after transmitting the wakeup signal to the UE so that the UE monitors for the communication (e.g., wakes up from an idle mode, and/or the like).

Although FIG. 5 shows example blocks of a method of wireless communication, in some aspects, the method may include additional blocks, fewer blocks, different blocks, or differently arranged blocks than those shown in FIG. 5.

Additionally, or alternatively, two or more blocks shown in FIG. 5 may be performed in parallel.

Figure 6:
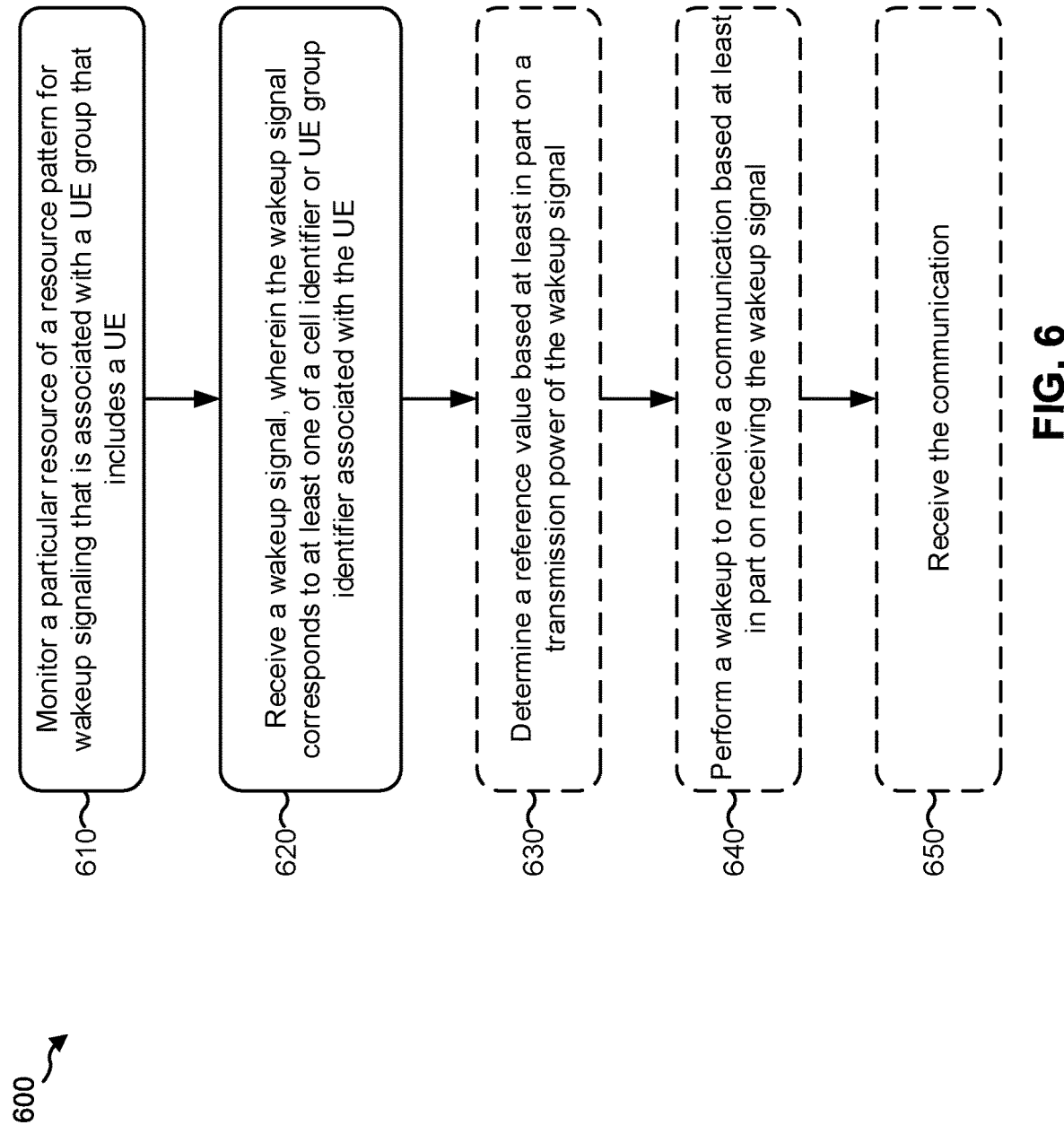
FIG. 6 is a flow chart of a method of wireless communication.

FIG. 6 is a flow chart of a method 600 of wireless communication. The method may be performed by a UE (e.g., the UE 120 of FIG. 1, apparatus 902/902', and/or the like).

At 610, the UE (e.g., using antenna 252, DEMOD 254, MIMO detector 256, receive processor 258, controller/processor 280, and/or the like) may monitor a particular resource of a resource pattern for wakeup signaling associated with a UE group that includes the UE. For example, the resource pattern may be associated with the UE group. The UE may monitor the particular resource for wakeup signaling directed to the UE group. When UEs of the UE group receive a wakeup signal, the UEs of the UE group may perform a wakeup and/or receive a subsequent communication. As used herein, waking up or performing a wakeup may refer to monitoring or beginning to monitor for paging at paging occasions. For example, when waking up or performing a wakeup, the UE may monitor or begin to monitor for a control channel (e.g., a PDCCH such as an MTC PDCCH or a narrowband PDCCH, etc.), a data channel (e.g., a PDSCH such as an MTC PDSCH or a narrowband PDSCH, etc.), and/or a different type of paging. In some aspects, configuration information, indicating that the UE is associated with the UE group, is received by the UE in system information.

In some aspects, the UE group is assigned to the UE based at least in part on a paging narrowband of the UE. In some aspects, a length of the particular resource is based at least in part on a maximum number of repetitions associated with a communication to be received by the UE.

At 620, the UE (e.g., using antenna 252, DEMOD 254, MIMO detector 256, receive processor 258, controller/processor 280, and/or the like) may receive a wakeup signal, wherein the wakeup signal corresponds to at least one of a cell identifier or UE group identifier associated with the UE. For example, at least a portion of the cell identifier and/or at least a portion of a UE group identifier may be indicated by the wakeup signal (e.g., a preamble of the wakeup signal). The UE may receive the wakeup signal based at least in part on the preamble. In some aspects, the portion of the UE group identifier is indicated by a preamble of the wakeup signal. In some aspects, the wakeup signal is received further based at least in part on a parameter of a preamble of the wakeup signal, wherein the UE is configured to detect the parameter of the preamble.

At 630, the UE (e.g., using controller/processor 280 and/or the like) may optionally determine a reference value based at least in part on a transmission power of the wakeup signal. For example, the transmission power may be based at least in part on a power offset relative to a downlink reference signal received by the UE. In this way, the UE may conserve network resources that would otherwise be used to transmit and/or use a separate synchronization signal to determine the reference value.

At 640, the UE (e.g., using antenna 252, DEMOD 254, MIMO detector 256, receive processor 258, controller/processor 280, and/or the like) may optionally perform a wakeup to receive a communication based at least in part on receiving the wakeup signal. For example, the UE may wake up to receive paging at a particular time based at least in part on receiving the wakeup signal. In some aspects, the UE may remain awake for a particular length of time after receiving the wakeup signal, as described in more detail elsewhere herein.

At 650, the UE (e.g., using antenna 252, DEMOD 254, MIMO detector 256, receive processor 258, controller/processor 280, and/or the like) may optionally receive the communication. For example, the UE may receive the communication after performing the wakeup. In some aspects, the communication is received after a delay, wherein the delay is based at least in part on a capability of the UE.

Although FIG. 6 shows example blocks of a method of wireless communication, in some aspects, the method may include additional blocks, fewer blocks, different blocks, or differently arranged blocks than those shown in FIG. 6. Additionally, or alternatively, two or more blocks shown in FIG. 6 may be performed in parallel.

Figure 7:
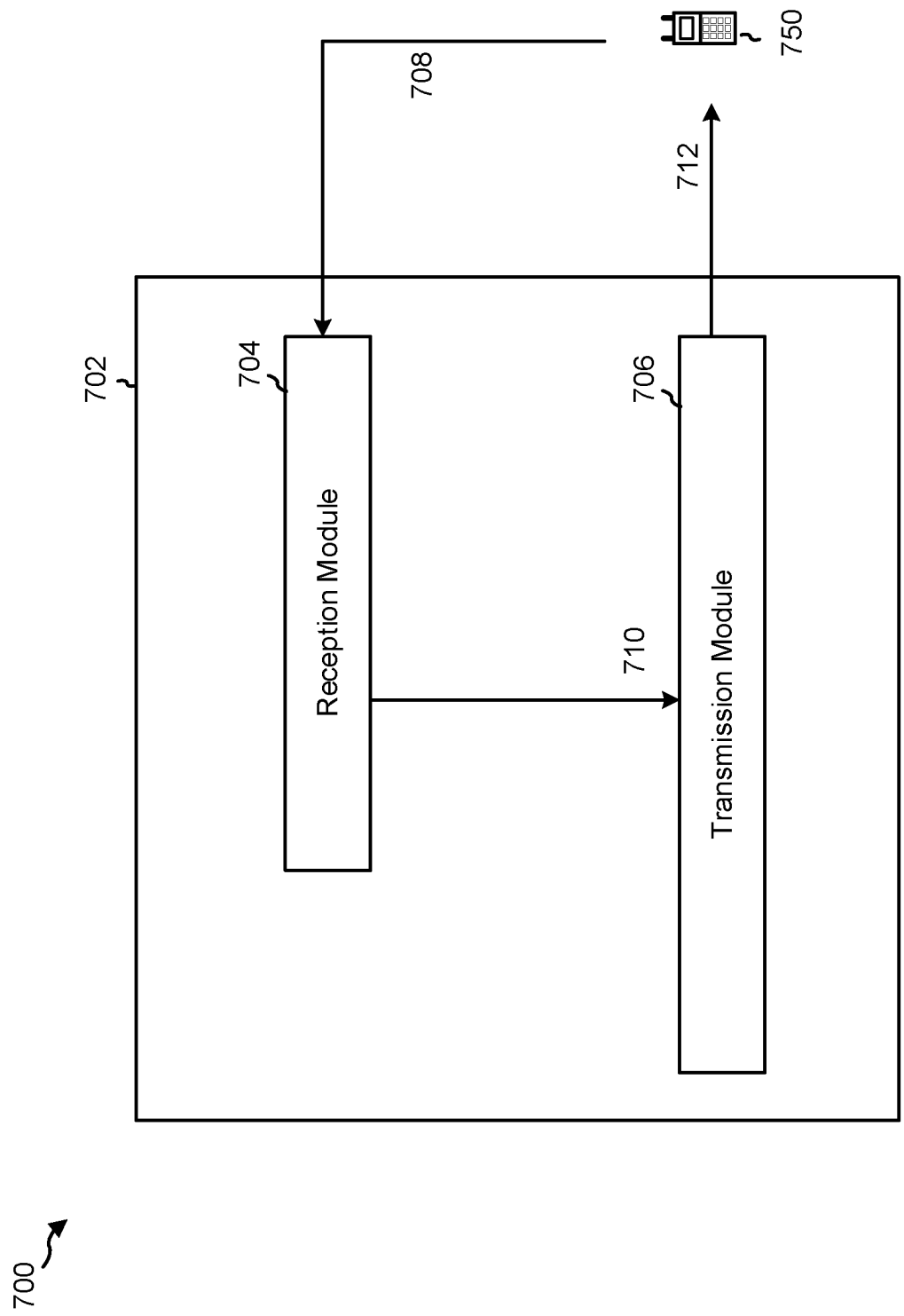
FIG. 7 is a conceptual data flow diagram illustrating the data flow between different modules/means/components in an example apparatus.

FIG. 7 is a conceptual data flow diagram 700 illustrating the data flow between different modules/means/components in an example apparatus 702. The apparatus 702 may be a base station, such as an eNB, a gNB, and/or the like. In some aspects, the apparatus 702 includes a reception module 704 and a transmission module 706.

The reception module 704 may receive signals 708 from a UE 750 (e.g., the UE 120 and/or the like). In some aspects, the signals 708 may identify a capability of the UE 750. The reception module may provide data 710 to the transmission module 706. The data 710 may identify the capability.

The transmission module 706 may transmit a wakeup signal and/or a communication based at least in part on the wakeup signal. For example, the transmission module 706 may generate a signal 712, and the apparatus 702 may transmit the signal 712 to the UE 750. The signal 712 may include the wakeup signal, the communication, and/or other information.

The apparatus may include additional modules that perform each of the blocks of the algorithm in the aforementioned flow chart of FIG. 5. As such, each block in the aforementioned flow chart of FIG. 5 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 7 are provided as an example. In practice, there may be additional modules, fewer modules, different modules, or differently arranged modules than those shown in FIG. 7. Furthermore, two or more modules shown in FIG. 7 may be implemented within a single module, or a single module shown in FIG. 7 may be implemented as multiple, distributed modules. Additionally, or alternatively, a set of modules (e.g., one or more modules) shown in FIG. 7 may perform one or more functions described as being performed by another set of modules shown in FIG. 7.

Figure 8:
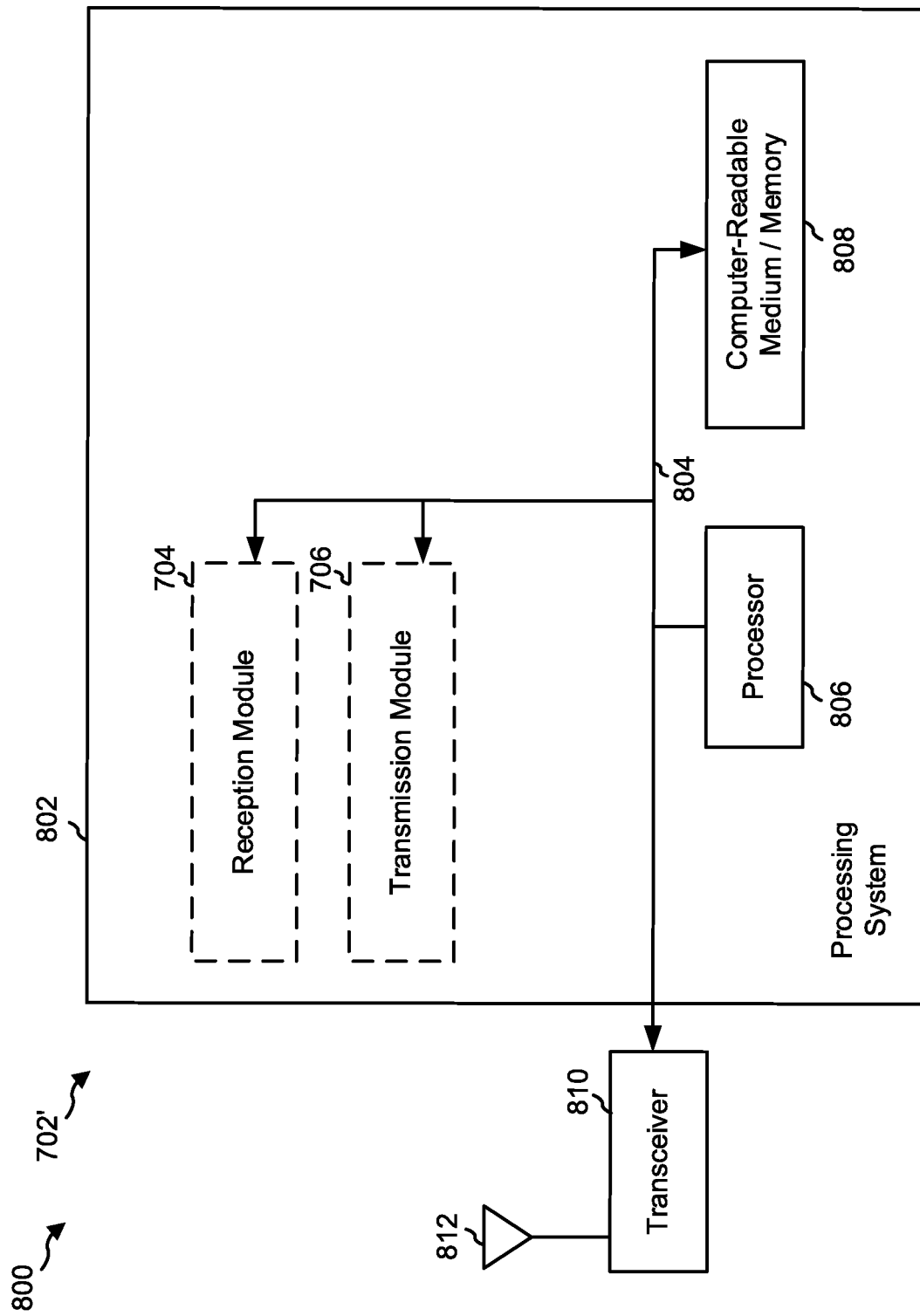
FIG. 8 is a diagram illustrating an example of a hardware implementation for an apparatus employing a processing system.

FIG. 8 is a diagram 800 illustrating an example of a hardware implementation for an apparatus 702' employing a processing system 802. The apparatus 702' may be a base station, such as an eNB, a gNB, and/or the like.

The processing system 802 may be implemented with a bus architecture, represented generally by the bus 804. The bus 804 may include any number of interconnecting buses and bridges depending on the specific application of the processing system 802 and the overall design constraints. The bus 804 links together various circuits including one or more processors and/or hardware modules, represented by the processor 806, the modules 704, 706, and the computer-readable medium/memory 808. The bus 804 may also link various other circuits such as timing sources, peripherals, voltage regulators, and power management circuits, which are well known in the art, and therefore, will not be described any further.

The processing system 802 may be coupled to a transceiver 810. The transceiver 810 is coupled to one or more antennas 812. The transceiver 810 provides a means for communicating with various other apparatus over a transmission medium. The transceiver 810 receives a signal from the one or more antennas 812, extracts information from the received signal, and provides the extracted information to the processing system 802, specifically the reception module 704. In addition, the transceiver 810 receives information from the processing system 802, specifically the transmission module 706, and based at least in part on the received information, generates a signal to be applied to the one or more antennas 812. The processing system 802 includes a processor 806 coupled to a computer-readable medium/memory 808. The processor 806 is responsible for general processing, including the execution of software stored on the computer-readable medium/memory 808. The software, when executed by the processor 806, causes the processing system 802 to perform the various functions described supra for any particular apparatus. The computer-readable medium/memory 808 may also be used for storing data that is manipulated by the processor 806 when executing software. The processing system further includes at least one of the modules 704 and 706. The modules may be software modules running in the processor 806, resident/stored in the computer-readable medium/memory 808, one or more hardware modules coupled to the processor 806, or some combination thereof. The processing system 802 may be a component of the BS 110 and may include the memory 242 and/or at least one of the TX MIMO processor 230, the receive processor 238, and/or the controller/processor 240.

In some aspects, the apparatus 702/702' for wireless communication includes means for transmitting a wakeup signal, means for transmitting a communication based at least in part on the wakeup signal, and/or the like. The aforementioned means may be one or more of the aforementioned modules of the apparatus 702 and/or the processing system 802 of the apparatus 702' configured to perform the functions recited by the aforementioned means. As described supra, the processing system 802 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

FIG. 8 is provided as an example. Other examples are possible and may differ from what was described in connection with FIG. 8.

Figure 9:
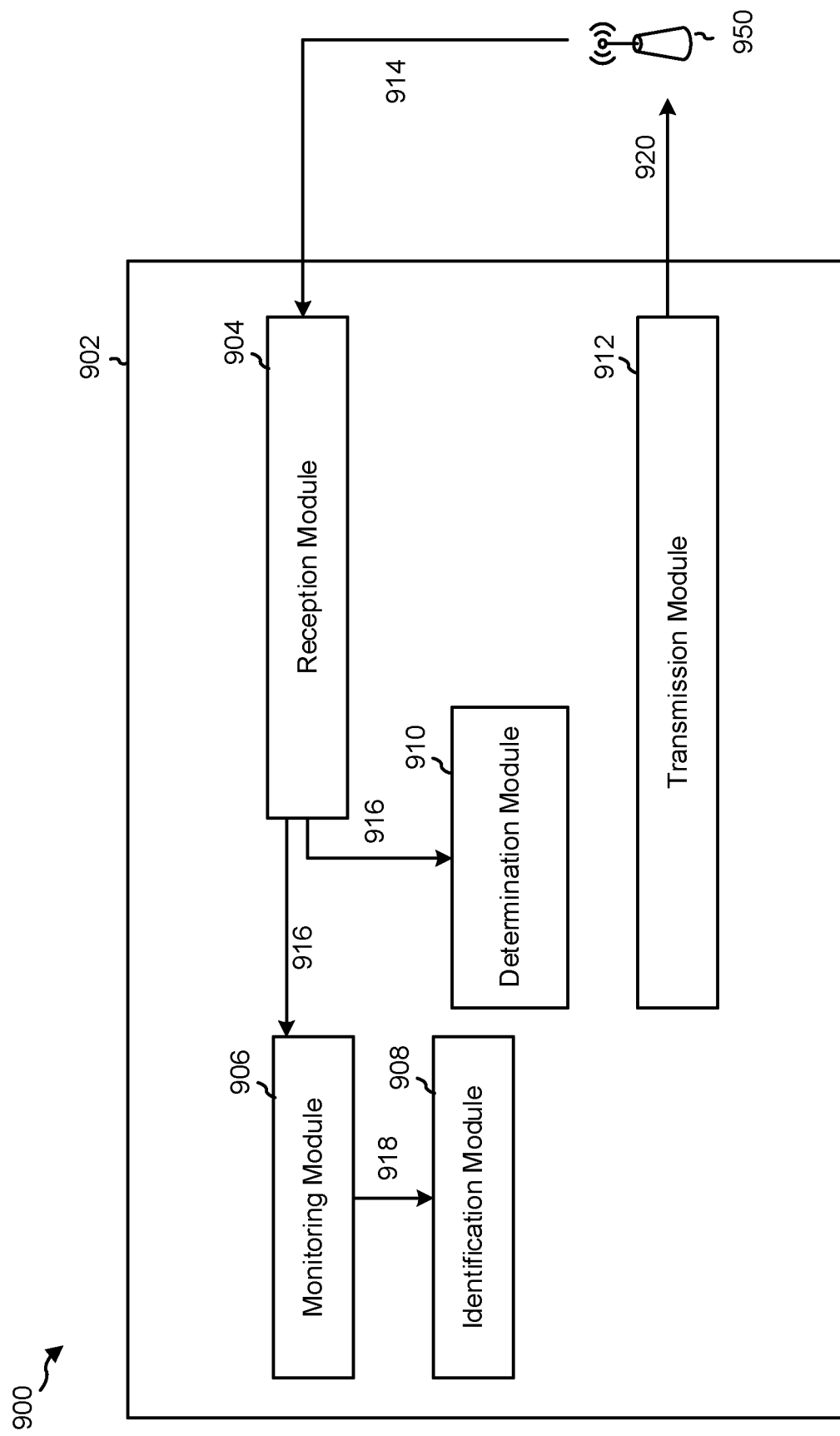
FIG. 9 is a conceptual data flow diagram illustrating the data flow between different modules/means/components in an example apparatus.

FIG. 9 is a conceptual data flow diagram 900 illustrating the data flow between different modules/means/components in an example apparatus 902. The apparatus 902 may be a UE. In some aspects, the apparatus 902 includes a reception module 904, a monitoring module 906, an identification module 908, a determination module 910, and/or a transmission module 912.

The reception module 904 may receive signals 914 from a BS 950. In some aspects, the signals 914 may include a wakeup signal and/or a communication associated with the wakeup signal. The reception module 904 may process the signals 914 and may provide data 916 to the monitoring module 906 and/or the determination module 910 based at least in part on the signals 914.

The monitoring module 906 may monitor a particular resource of a resource pattern for wakeup signaling that is associated with a UE group, wherein the resource pattern is associated with the UE group, and may provide data 918 to the identification module 908 based at least in part on the monitoring. The identification module 908 may identify or receive a wakeup signal using the data 918 that is associated with at least one of a cell identifier or UE group identifier, wherein at least a portion of the cell identifier or a portion of the UE group identifier is indicated by the wakeup signal.

In some aspects, the reception module 904 may receive and/or identify the wakeup signal.

The determination module 910 may determine a reference value based at least in part on a transmission power of the wakeup signal, wherein the transmission power is based at least in part on a power offset relative to a downlink reference signal received by the apparatus 902.

The transmission module 912 may transmit signals 920. In some aspects, the signals 920 may identify a capability of the apparatus 902.

The apparatus may include additional modules that perform each of the blocks of the algorithm in the aforementioned flow chart of FIG. 6. As such, each block in the aforementioned flow chart of FIG. 6 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 9 are provided as an example. In practice, there may be additional modules, fewer modules, different modules, or differently arranged modules than those shown in FIG. 9. Furthermore, two or more modules shown in FIG. 9 may be implemented within a single module, or a single module shown in FIG. 9 may be implemented as multiple, distributed modules. Additionally, or alternatively, a set of modules (e.g., one or more modules) shown in FIG. 9 may perform one or more functions described as being performed by another set of modules shown in FIG. 9.

Figure 10:
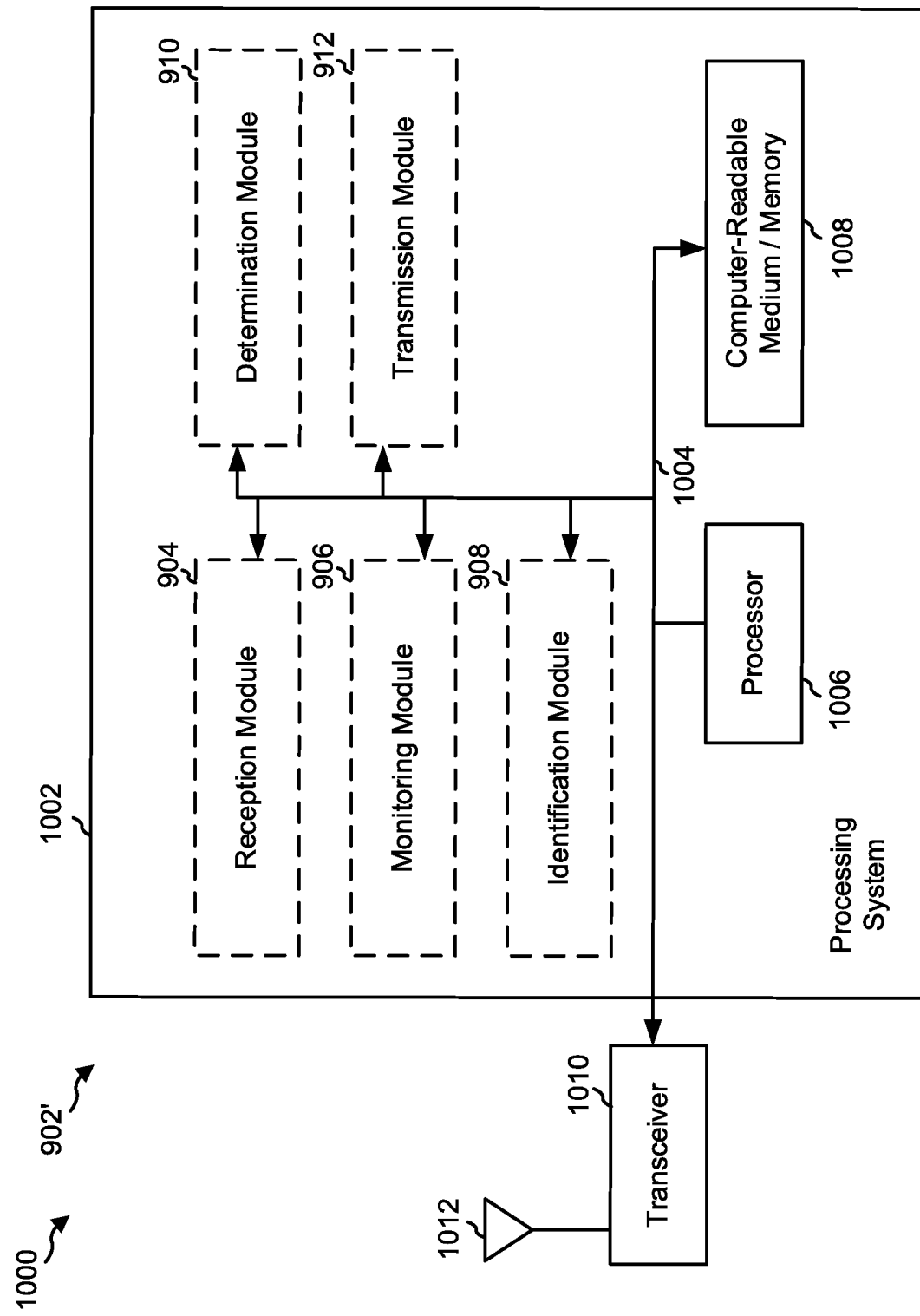
FIG. 10 is a diagram illustrating an example of a hardware implementation for an apparatus employing a processing system.

FIG. 10 is a diagram 1000 illustrating an example of a hardware implementation for an apparatus 902' employing a processing system 1002. The apparatus 902' may be a UE.

The processing system 1002 may be implemented with a bus architecture, represented generally by the bus 1004. The bus 1004 may include any number of interconnecting buses and bridges depending on the specific application of the processing system 1002 and the overall design constraints. The bus 1004 links together various circuits including one or more processors and/or hardware modules, represented by the processor 1006, the modules 904, 906, 908, 910, 912, and the computer-readable medium/memory 1008. The bus 1004 may also link various other circuits such as timing sources, peripherals, voltage regulators, and power management circuits, which are well known in the art, and therefore, will not be described any further.

The processing system 1002 may be coupled to a transceiver 1010. The transceiver 1010 is coupled to one or more antennas 1012. The transceiver 1010 provides a means for communicating with various other apparatus over a transmission medium. The transceiver 1010 receives a signal from the one or more antennas 1012, extracts information from the received signal, and provides the extracted information to the processing system 1002, specifically the reception module 904. In addition, the transceiver 1010 receives information from the processing system 1002, specifically the transmission module 912 and based at least in part on the received information, generates a signal to be applied to the one or more antennas 1012. The processing system 1002 includes a processor 1006 coupled to a computer-readable medium/memory 1008. The processor 1006 is responsible for general processing, including the execution of software stored on the computer-readable medium/memory 1008. The software, when executed by the processor 1006, causes the processing system 1002 to perform the various functions described supra for any particular apparatus. The computer-readable medium/memory 1008 may also be used for storing data that is manipulated by the processor 1006 when executing software. The processing system further includes at least one of the modules 904, 906, 908, 910, and 912. The modules may be software modules running in the processor 1006, resident/stored in the computer-readable medium/memory 1008, one or more hardware modules coupled to the processor 1006, or some combination thereof. The processing system 1002 may be a component of the UE 120 and may include the memory 282 and/or at least one of the TX MIMO processor 266, the RX processor 258, and/or the controller/processor 280.

In some aspects, the apparatus 902/902' for wireless communication includes means for monitoring a particular resource of a resource pattern for wakeup signaling that is associated with a UE group that includes the apparatus 902/902', wherein the resource pattern is associated with the UE group; means for receiving a wakeup signal, wherein the wakeup signal corresponds to at least one of a cell identifier or UE group identifier associated with the apparatus 902/902', wherein at least a portion of the cell identifier or a portion of the UE group identifier is indicated by the wakeup signal; means for determining a reference value based at least in part on a transmission power of the wakeup signal, wherein the transmission power is based at least in part on a power offset relative to a synchronization signal received by the apparatus 902/902'; means for performing a wakeup to receive a communication based at least in part on receiving the wakeup signal; means for receiving the communication; and/or means for monitoring for the communication between the wakeup signal and a time associated with the maximum delay. The aforementioned means may be one or more of the aforementioned modules of the apparatus 902 and/or the processing system 1002 of the apparatus 902' configured to perform the functions recited by the aforementioned means. As described supra, the processing system 1002 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 10 is provided as an example. Other examples are possible and may differ from what was described in connection with FIG. 10.

Wakeup Signal Configuration

Figure 11:
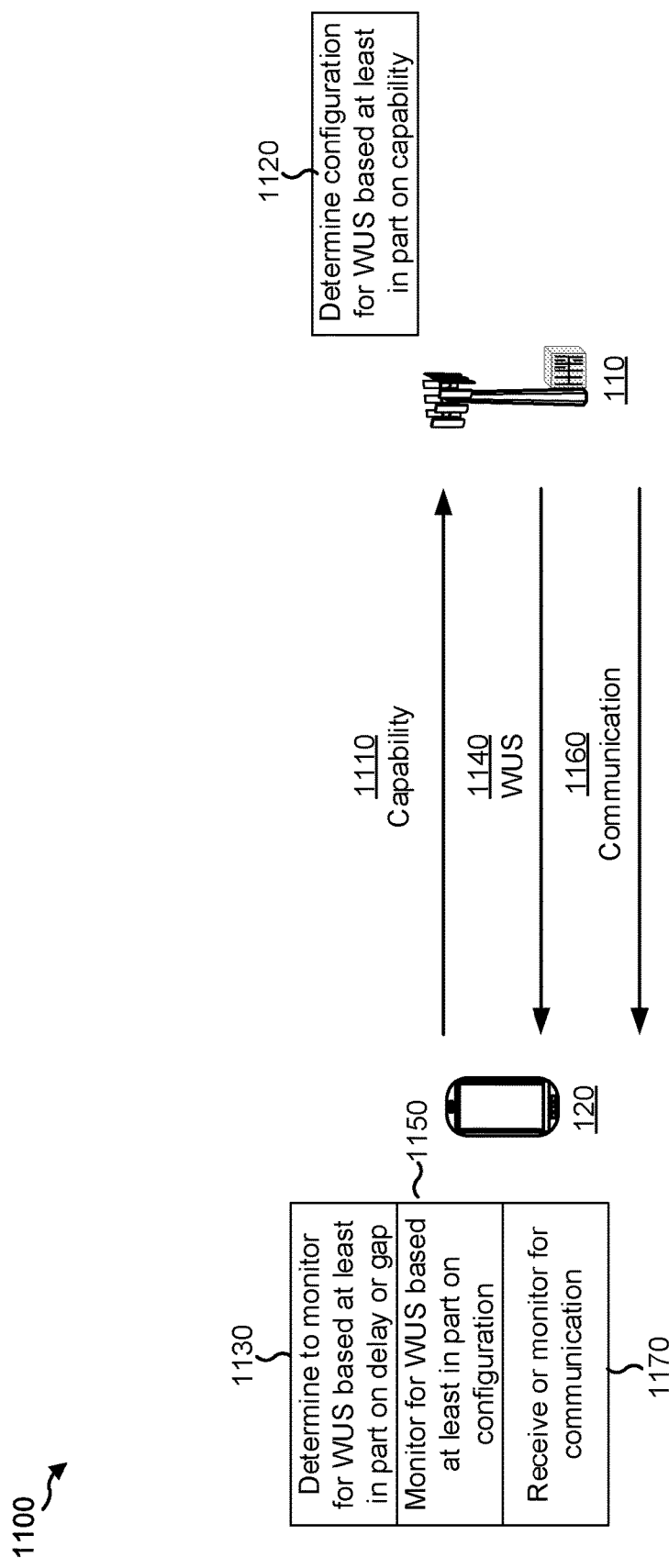
FIG. 11 is a diagram illustrating an example of configuration of a wakeup signal based at least in part on a UE capability.

FIG. 11 is a diagram illustrating an example 1100 of configuration of a wakeup signal based at least in part on a UE capability.

As shown in FIG. 11, and by reference number 1110, a UE 120 may transmit or provide information identifying a capability. For example, the UE 120 may report information identifying whether a receiver of the UE 120 is configured to identify legacy synchronization signals. Additionally, or alternatively, the UE 120 may report information identifying a detection and/or synchronization time of a receiver of the UE 120. Additionally, or alternatively, the UE 120 may report information identifying a synchronization processing time between the wakeup signal and a subsequent communication. For example, the UE 120 may report information indicating whether the UE 120 has a first delay (e.g., no delay or 0 ms), a second delay (e.g., a shorter delay or approximately 15 ms), or a third delay (e.g., a longer delay or approximately 500 ms). This delay may be referred to in some cases herein as a gap. In some aspects, the capability may identify a repetition configuration of the UE 120 (e.g., a number of repetitions needed to decode a communication). In some aspects, the capability may indicate whether the UE 120 is associated with a DRX cycle, an eDRX cycle, and/or the like.

As shown by reference number 1120, the BS 110 may determine a configuration for a wakeup signal based at least in part on the information identifying the capability. The configuration may identify a delay or gap between the wakeup signal and the communication, a number of repetitions for the wakeup signal, and/or the like. In some aspects, the configuration may identify a resource for the wakeup signal. For example, the BS 110 may determine a number of resources for the wakeup signal, a starting resource of the wakeup signal, one or more antenna ports for transmitting the wakeup signal, a transmission power for the wakeup signal, and/or the like, as described in more detail below. In some aspects, the BS 110 may provide information identifying the configuration to the UE 120. The configuration may be referred to herein as a wakeup signal configuration.

In some aspects, the BS 110 may determine a delay or gap between the wakeup signal and the communication based at least in part on the capability. For example, the BS 110 may transmit the communication after a delay or gap based at least in part on the information identifying the capability of the UE 120. In some aspects, the UE 120 may monitor for the communication after the delay. Additionally, or alternatively, the UE 120 may monitor for the communication for a particular length of time, such as a maximum delay.

In some aspects, the configuration may be based at least in part on a repetition configuration of the UE 120. For example, a UE 120 may require a particular number of repetitions to successfully decode a communication (e.g., 1 repetition, 4 repetitions, 16 repetitions, 64 repetitions, 2048 repetitions, etc.). It may not be beneficial to awaken a UE 120 for a communication having fewer repetitions than the particular number of repetitions since decoding of the communication is unlikely to succeed.

Therefore, the length of the wakeup signal resources may be configured based at least in part on a repetition configuration of the UE 120. For example, a wakeup signal resource length may be determined based at least in part on a maximum number of repetitions of a communication. A wakeup signal may be transmitted within the wakeup signal resource, and a number of resources used for the wakeup signal may be based at least in part on an actual number of repetitions of the communication. The UE 120 may monitor particular resources for a wakeup signal based at least in part on a repetition configuration of the UE 120.

For example, assume that the maximum number of repetitions of the communication is 2048 repetitions. Assume further that the UE 120 is configured with a reduction factor of 16. The reduction factor may identify a relationship between the number of repetitions of the communication and the number of repetitions of the wakeup signal. In this case, a maximum number of repetitions of the wakeup signal is a value M of 128 repetitions (e.g., 2048/16). If a communication is to start in subframe N, then the wakeup signal resources can start in subframes N-M, N-2M, N-3M, and so on. More particularly, wakeup signal resources for the UE 120 may start at respective subframes N-M, N-2M, N-3M, and N-4M. In other words, the communication may be associated with four wakeup signal resources that start at N-M, N-2M, N-3M, and N-4M.

Now assume that the communication has an actual number of repetitions of 128 repetitions. In that case, and according to the reduction factor, the length of the wakeup signal may be 8 repetitions (e.g., 128/16). In some aspects, the 8 repetitions of the wakeup signal may be transmitted starting at the end of each wakeup signal resource (e.g., N-8, N-7, . . . , N-1). In some aspects, the 8 repetitions of the wakeup signal may be transmitted starting at the beginning of each wakeup resource, (e.g., N-M, N-M+1, . . . , N-M+7). In this way, wakeup signal resources are configured based at least in part on a maximum number of repetitions and an actual number of repetitions of a communication.

As shown by reference number 1130, the UE 120 may determine whether to detect the wakeup signal based at least in part on a delay or gap. The delay or gap may be a delay between transmitting the wakeup signal and the communication, and may be referred to herein as a configured delay or gap, a required delay or gap, a delay, and/or the like. For example, the BS 110 may provide information identifying the delay or gap and/or the like. In some aspects, the UE 120 may determine or select whether to detect a wakeup signal (e.g., may enable or disable wakeup signal detection) based at least in part on the configured delay or gap configured by the base station 110. For example, the configured delay or gap may be different from a required delay or gap associated with the UE 120. In some aspects, the UE 120 may indicate the selected behavior (e.g., whether wakeup signal detection is enabled or disabled for the UE 120) to the base station and/or the mobility management entity (MME).

In some aspects, the UE 120 may determine whether to detect the wakeup signal based at least in part on a discontinuous reception (DRX) configuration of the UE 120. For example, in the case of DRX, the UE 120 requires a non-zero gap between the end of the maximum wakeup signal duration and the associated paging occasion. The gap may be used for tracking, channel estimation warmup, and/or the like. In the case of eDRX, the UE 120 may require a longer gap than in DRX depending on the receiver architecture. If the UE 120 uses a receiver to update and/or load the image (e.g., software for paging detection) after deep sleep when a wakeup signal is detected, then a longer gap is needed to perform image updating for paging detection, tracking time, channel estimation warmup, and/or the like. If the UE 120 uses a receiver to obtain the updated image, regardless of whether the UE 120 detects a wakeup signal, then the processing time could be similar as that of DRX.

For DRX, the minimum gap for the wakeup signal may be predefined, such as 20 ms for MTC, 40 ms for NB-IoT, and/or the like. For eDRX, several candidate gaps for the wakeup signal may be predefined, and the UE 120 may report the required minimum gap by selecting one of the candidate gaps. For example, one bit may indicate two different candidate minimum gaps, such as a short gap and a long gap. The short gap may correspond to a DRX gap, and the long gap may correspond to is gap for NB-IoT or 2s gap for MTC.

If the base station 110 enables wakeup signals, then the base station 110 may configure the gap to be no less than the minimum gap for the DRX scenario. Otherwise, the UE 120 will not expect the wakeup signal to be enabled. If the base station 110 enables the wakeup signals and supports eDRX, then the base station 110 may configure the gap based at least in part on the gap reported by the UE 120. However, the configured gap may not be UE-specific, in some aspects. Therefore, the configured gap may be different from the required gap of some UEs 120. For example, the configured gap may be larger or smaller than the required UE gap. Under this condition, the UE 120 may still detect the wakeup signal or the UE 120 may not detect the wakeup signal. The UE may select or determine whether to detect the wakeup signal or not (e.g., whether to enable or disable wakeup signal detection), and may explicitly indicate the selection or determination to the base station 110 and/or an MME. For example, the UE 120 may indicate one bit signaling to the MME, and the MME may inform the base station(s) 110 in the tracking area of the UE 120. Alternatively, the UE behavior may be predefined without additional signaling. Additionally, or alternatively, the UE selection or determination may not be signaled to the base station 110 and/or the MME. Under such a condition, the base station 110 may assume that the UE 120 will detect wakeup signal, and may transmit the wakeup signal when there is a paging for the UE 120. However, under this condition, nearby UEs 120 may wake up more frequently due to the wakeup signal, which the target UE 120 may not be monitoring.

As an example, the UE 120 may require a long gap for eDRX mode, but the base station 110 may configure a gap to be less than the UE required long gap. The UE 120 may still determine to detect the wakeup signal within the configured short gap (using the receiver required shorter time, but obtaining less power savings). Under these conditions, the base station 110 should transmit the wakeup signal if there is paging for this UE 120. However, the UE 120 may not detect the wakeup signal but may directly detect paging (e.g., every DRX within a paging time window (PTW) in eDRX mode). Accordingly, in this implementation, the base station 110 should not send the wakeup signal to avoid waking up other UEs 120.

As another example, the UE 120 may require a short gap, but the base station 110 may configure a gap that is larger than the UE required gap. The UE 120 may still determine to detect the wakeup signal, but will have to wait longer time for the paging after wakeup signal detection. In this case, the base station 110 could transmit the wakeup signal if there is paging for this UE 120. However, the UE 120 may not detect the wakeup signal but directly detect paging (e.g., every DRX within PTW in eDRX mode). For a UE 120 in good coverage, the power saving gain by using the wakeup signal and burn power during the long gap between the wakeup signal and the associated paging occasion is about the same as that without using a wakeup signal. Accordingly, in this implementation, the base station 110 would not send the wakeup signal due to the paging for this UE 120. By reducing the wakeup signal transmissions, the base station 110 could avoid waking up other UEs 120.

As shown by reference number 1140, the BS 110 may transmit the wakeup signal to the UE 120. For example, the BS 110 may transmit the wakeup signal using the configuration determined in connection with reference number 1120, above. In some aspects, the BS 110 may transmit the wakeup signal using particular resources. For example, the BS 110 may transmit the wakeup signal using a resource identified by the configuration, using a resource associated with a UE group of the UE 120, and/or the like.

As shown by reference number 1150, the UE 120 may identify the wakeup signal based at least in part on the configuration. For example, the UE 120 may monitor a resource associated with the wakeup signal based at least in part on the configuration. In some aspects, the UE 120 may identify the wakeup signal based at least in part on a preamble of the wakeup signal. In some aspects, the UE 120 may not attempt to monitor for or identify the wakeup signal. For example, the UE 120 may determine that the UE 120 is not to monitor for the wakeup signal based at least in part on the delay or gap described in connection with reference number 1130, above, and may not monitor for or identify the wakeup signal.

In some aspects, a UE 120 may perform synchronization and/or determine a reference value based at least in part on a wakeup signal. For example, the BS 110 may configure a power level for the wakeup signal, and may provide information identifying the power level to the UE 120 (e.g., via a system information block, a radio resource control (RRC) signaling, and/or the like). In some aspects, the information identifying the power level may include a power offset relative to a synchronization signal or downlink reference signal (e.g., PSS, SSS, NPSS, NSSS, reference signal (RS), NRS, and/or the like). The UE 120 may perform synchronization and/or determine the reference value based at least in part on the power level of the wakeup signal. In some aspects, when no power offset is specified, the UE 120 may use a default offset (e.g., 0 dB and/or the like).

As shown by reference number 1160, the BS 110 may transmit a communication to the UE 120. For example, the BS 110 may use the delay or gap described above to transmit the communication. As shown by reference number 1170, the UE 120 may receive or monitor for the communication. For example, the UE 120 may enter an active mode, may leave an idle mode, may wake up, and/or the like. In this way, the BS 110 and the UE 120 determine a configuration for a wakeup signal and perform a communication after the wakeup signal is transmitted to the UE 120.

FIG. 11 is provided as an example. Other examples are possible and may differ from what was described in connection with FIG. 11.

Figure 12:
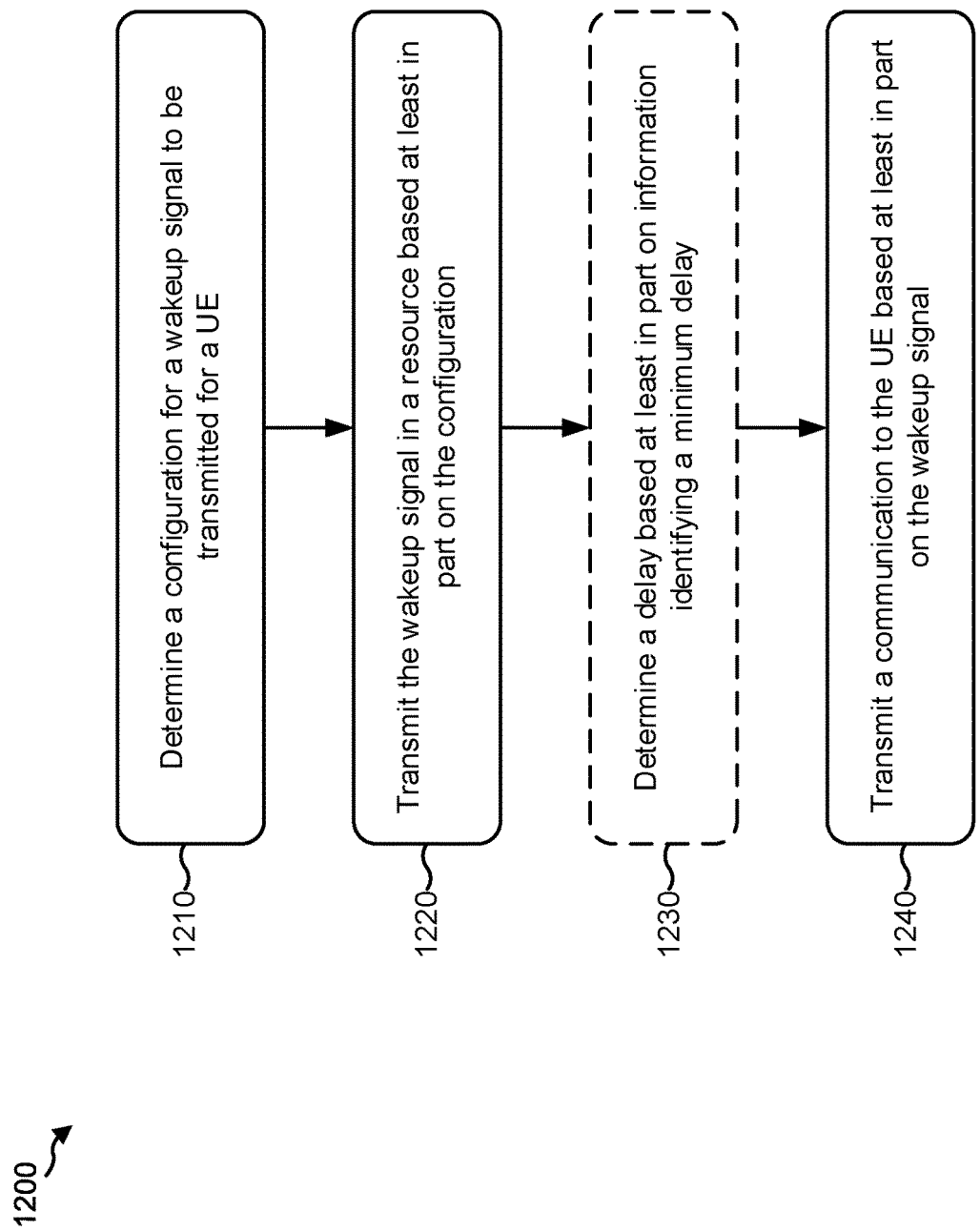
FIG. 12 is a flow chart of a method of wireless communication.

FIG. 12 is a flow chart of a method 1200 of wireless communication. The method may be performed by a base station (e.g., the BS 110 of FIG. 1, apparatus 1402/1402', and/or the like).

At 1210, the base station (e.g., using controller/processor 240 and/or the like) may determine a configuration for a wakeup signal associated with a UE. For example, the base station may receive information identifying a capability of the UE. The base station may use the information identifying the capability to determine the configuration for the wakeup signal. In some aspects, the configuration may identify a resource for the wakeup signal, a length of the wakeup signal, a number of repetitions associated with the wakeup signal, a transmission power for the wakeup signal, and/or the like. In some aspects, the base station may transmit information identifying the configuration to the UE. In some aspects, the configuration is determined based at least in part on a capability of the UE. In some aspects, the capability relates to at least one of a receiver type of the UE or a processing time (e.g., a synchronization processing time, a tracking processing time, a processing time for loading or updating an image or control information for paging detection, a processing time for channel estimation warmup, etc.). For example, different UEs may be associated with different receiver types that have different hardware architectures. As one example, a UE may use complex baseband processing to perform monitoring for paging, and may have a low-power wakeup receiver (e.g., that may perform correlations or may only perform correlations). The UE may activate the baseband modem only when the wakeup signal is detected by the low-power wakeup receiver. The receiver type may indicate whether the UE is associated with a low-power receiver, a wakeup receiver, a low-power wakeup and/or the like. Additionally, or alternatively, the receiver type may indicate a processor that performs monitoring (e.g., a processor for paging monitoring, a processor for wakeup signal monitoring, and/or the like).

In some aspects, the configuration indicates that the communication will be delayed based at least in part on the capability. In some aspects, a delay for the communication is based at least in part on information identifying a minimum delay associated with one or more UEs including the UE.

At 1220, the base station (e.g., using controller/processor 240, transmit processor 220, TX MIMO processor 230, MOD 232, antenna 234, and/or the like) may transmit the wakeup signal in a resource based at least in part on the configuration. For example, the base station may determine the resource for the wakeup signal based at least in part on the configuration. In some aspects, the base station may determine the resource based at least in part on a UE group associated with the UE. For example, the base station may select a resource corresponding to the UE group associated with the UE.

In some aspects, the resource is based at least in part on a number of repetitions of the communication. In some aspects, the resource is based at least in part on an actual number of repetitions of the communication. In some aspects, the one or more first resources and the one or more second resources are multiplexed with resources associated with at least one other UE group of a plurality of UE groups including the first UE group and the second UE group. In some aspects, the UE is configured with a maximum resource duration, and an actual resource duration for the wakeup signal is no larger than the configured maximum resource duration. In some aspects, a start of the resource is configured based at least in part on a configured maximum resource duration, and a gap or delay before the communication. In some aspects, a start of the resource is aligned with a starting point of a wakeup signal that is associated with a configured maximum resource duration.

At 1230, the base station (e.g., using controller/processor 240 and/or the like) may optionally determine a delay based at least in part on information identifying a minimum delay. For example, the base station may determine a delay or gap to be provided between the wakeup signal and the communication. In some aspects, the base station may determine the delay or gap based at least in part on information identifying a minimum delay of one or more UEs. For example, the minimum delay may identify a shortest possible delay for the one or more UEs to successfully receive the communication after the wakeup signal.

At 1240, the base station (e.g., using controller/processor 240, transmit processor 220, TX MIMO processor 230, MOD 232, antenna 234, and/or the like) may transmit a communication to the UE based at least in part on the wakeup signal. For example, the base station may transmit the communication after the delay or gap. In some aspects, the communication is transmitted before a configured delay has elapsed. In some aspects, a transmission power of the wakeup signal is configured based at least in part on a power offset related to a downlink reference signal transmitted by the base station. In some aspects, the UE 120 may receive or monitor for the communication. For example, the UE 120 may enter an active mode, may leave an idle mode, may wake up, and/or the like. In this way, the BS 110 and the UE 120 determine a configuration for a wakeup signal and perform a communication after the wakeup signal is transmitted to the UE 120.

Although FIG. 12 shows example blocks of a method of wireless communication, in some aspects, the method may include additional blocks, fewer blocks, different blocks, or differently arranged blocks than those shown in FIG. 12. Additionally, or alternatively, two or more blocks shown in FIG. 12 may be performed in parallel.

Figure 13:
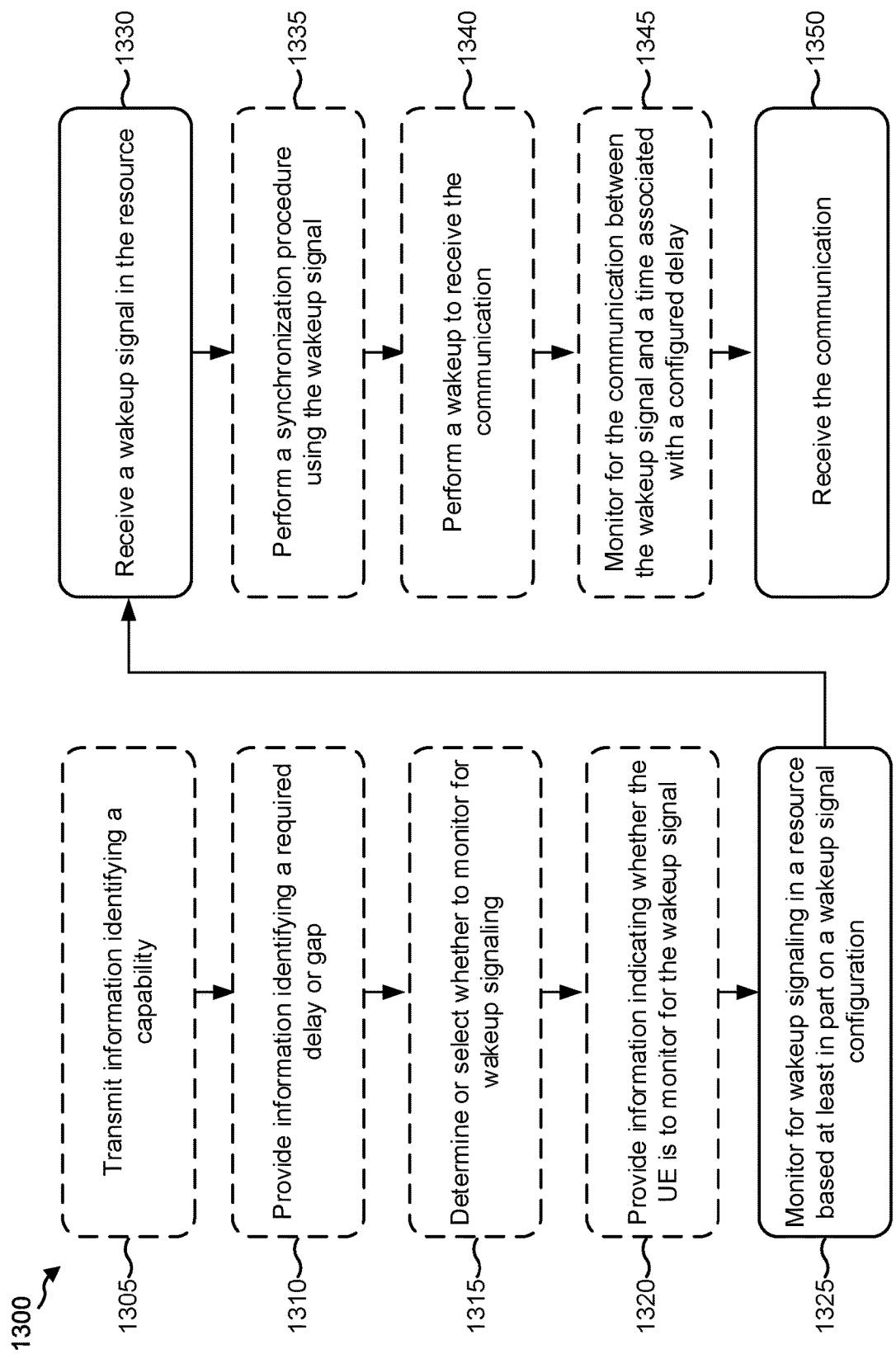
FIG. 13 is a flow chart of a method of wireless communication.

FIG. 13 is a flow chart of a method 1300 of wireless communication. The method may be performed by a UE (e.g., the UE 120 of FIG. 1, apparatus 1602/1602', and/or the like).

At 1305, the UE (e.g., using controller/processor 280, transmit processor 264, TX MIMO processor 266, MOD 254, antenna 252, and/or the like) may optionally transmit information to a base station identifying a capability. In some aspects, the capability relates to at least one of a receiver type of the UE or a processing time of the UE (e.g., a synchronization processing time, a tracking processing time, a processing time for loading or updating an image or control information for paging detection, a processing time for channel estimation warmup, etc.). The receiver type is described in more detail elsewhere herein. In some aspects, the capability may identify a minimum delay or gap associated with the UE (e.g., a minimum delay or gap between the wakeup signal and the communication). In some aspects, the UE may provide or signal the information identifying the capability. For example, the UE may transmit, provide, or signal the information identifying the capability using radio resource control (RRC), signaling media access control (MAC) signaling, higher layer signaling, or another type of signaling.

At 1310, the UE (e.g., using controller/processor 280, transmit processor 264, TX MIMO processor 266, MOD 254, antenna 252, and/or the like) may optionally provide information identifying a required delay or gap. The required delay or gap may identify a minimum delay or gap between the wakeup signal and the communication. If the configured delay or gap (e.g., configured by the BS) is shorter than the required delay or gap, then the UE may not be able to decode the communication.

At 1315, the UE (e.g., using controller/processor 280 and/or the like) may optionally determine or select whether to monitor wakeup signaling. In some aspects, the UE may determine or select whether to detect or monitor for the wakeup signal based at least in part on a configured delay or gap or an actual delay or gap. For example, the BS may select a delay or gap for the wakeup signal based at least in part on information identifying the required delay or gap for the UE and/or for other UEs. The BS may provide configuration information to the UE identifying the configured delay or gap. The UE may determine whether the configured delay or gap is within the confines of the required delay or gap. When the configured delay or gap is within the confines of the required delay or gap, the UE may determine to detect the wakeup signal. When the configured delay or gap is not within the confines of the required delay or gap, the UE may determine not to detect the wakeup signal.

At 1320, the UE (e.g., using controller/processor 280, transmit processor 264, TX MIMO processor 266, MOD 254, antenna 252, and/or the like) may optionally provide information indicating whether the UE is to monitor for the wakeup signaling. For example, the UE may provide (e.g., signal, transmit) information to the BS that indicates whether the UE is to monitor for the wakeup signal. In some aspects, the BS may determine whether to transmit the wakeup signal based at least in part on this information. For example, the BS may determine that the BS is not to transmit a wakeup signal if a threshold number of UEs are not to monitor for the wakeup signaling, if one or more UEs are not to monitor for the wakeup signaling, and/or the like.

At 1325, the UE (e.g., using antenna 252, DEMOD 254, MIMO detector 256, receive processor 258, controller/processor 280, and/or the like) may monitor for wakeup signaling in a resource based at least in part on a wakeup signal configuration. For example, the UE may monitor for wakeup signaling in a resource. In some aspects, the UE may identify the resource based at least in part on a wakeup signal configuration. For example, the wakeup signal configuration may identify the resource. In some aspects, the wakeup signal configuration may be based at least in part on the capability. In some aspects, the UE may use information in the configuration (e.g., a random access configuration, a resource pattern, etc.) to determine the resource. In some aspects, the UE may be preconfigured with the resource. In some aspects, the UE may identify the wakeup signal based at least in part on a preamble of the wakeup signal, as described in more detail elsewhere herein.

In some aspects, the resource is one of a plurality of resources monitored by the UE for the wakeup signaling, wherein the plurality of resources are determined based at least in part on a maximum number of repetitions and an actual number of repetitions associated with the communication. For example, the UE may determine an actual number of repetitions associated with the communication and a maximum number of repetitions associated with the communication. The UE may select a resource, of the plurality of resources, and may monitor for wakeup signaling on the selected resource, as described in more detail elsewhere herein.

At 1330, the UE (e.g., using antenna 252, DEMOD 254, MIMO detector 256, receive processor 258, controller/processor 280, and/or the like) may receive a wakeup signal. For example, the UE may receive the wakeup signal based at least in part on monitoring for the wakeup signaling. In some aspects, the UE may detect or identify the wakeup signal (e.g., based at least in part on a preamble of the wakeup signal, a UE group identifier of the UE, a cell identifier of the UE, and/or the like).

At 1335, the UE (e.g., using antenna 252, DEMOD 254, MIMO detector 256, receive processor 258, controller/processor 280, and/or the like) may optionally perform a synchronization procedure using the wakeup signal. For example, the BS may configure a power level for the wakeup signal, and may provide information identifying the power level to the UE (e.g., via a SIB, a radio resource control (RRC) signaling, and/or the like). In some aspects, the information identifying the power level may include a power offset relative to a synchronization signal or downlink reference signal (e.g., PSS, SSS, NPSS, NSSS, RS, NRS, and/or the like). The UE 120 may perform synchronization and/or determine the reference value based at least in part on the power level of the wakeup signal.

At 1340, the UE (e.g., using antenna 252, DEMOD 254, MIMO detector 256, receive processor 258, controller/processor 280, and/or the like) may optionally perform a wakeup to receive the communication. For example, the UE may identify the wakeup signal, and may perform a wakeup after a delay or gap to receive the communication. In some aspects, the UE may perform the wakeup after the configured delay or gap. In some aspects, the UE may perform the wakeup to receive a data communication, a control communication, paging, and/or the like.

At 1345, the UE (e.g., using antenna 252, DEMOD 254, MIMO detector 256, receive processor 258, controller/processor 280, and/or the like) may optionally monitor for the communication between the wakeup signal and a time associated with a configured delay. For example, the UE may begin monitoring after receiving the wakeup signal, and may monitor until the end of a time associated with the configured delay.

At 1350, the UE (e.g., using antenna 252, DEMOD 254, MIMO detector 256, receive processor 258, controller/processor 280, and/or the like) may receive the communication. For example, the UE may receive the communication after performing the wakeup. In some aspects, the communication is received after a delay based at least in part on a capability of the UE. In some aspects, the UE may transmit information identifying the capability to a base station that transmits the communication. In some aspects, the communication is received before a maximum delay has elapsed.

Although FIG. 13 shows example blocks of a method of wireless communication, in some aspects, the method may include additional blocks, fewer blocks, different blocks, or differently arranged blocks than those shown in FIG. 13. Additionally, or alternatively, two or more blocks shown in FIG. 13 may be performed in parallel.

Figure 14:
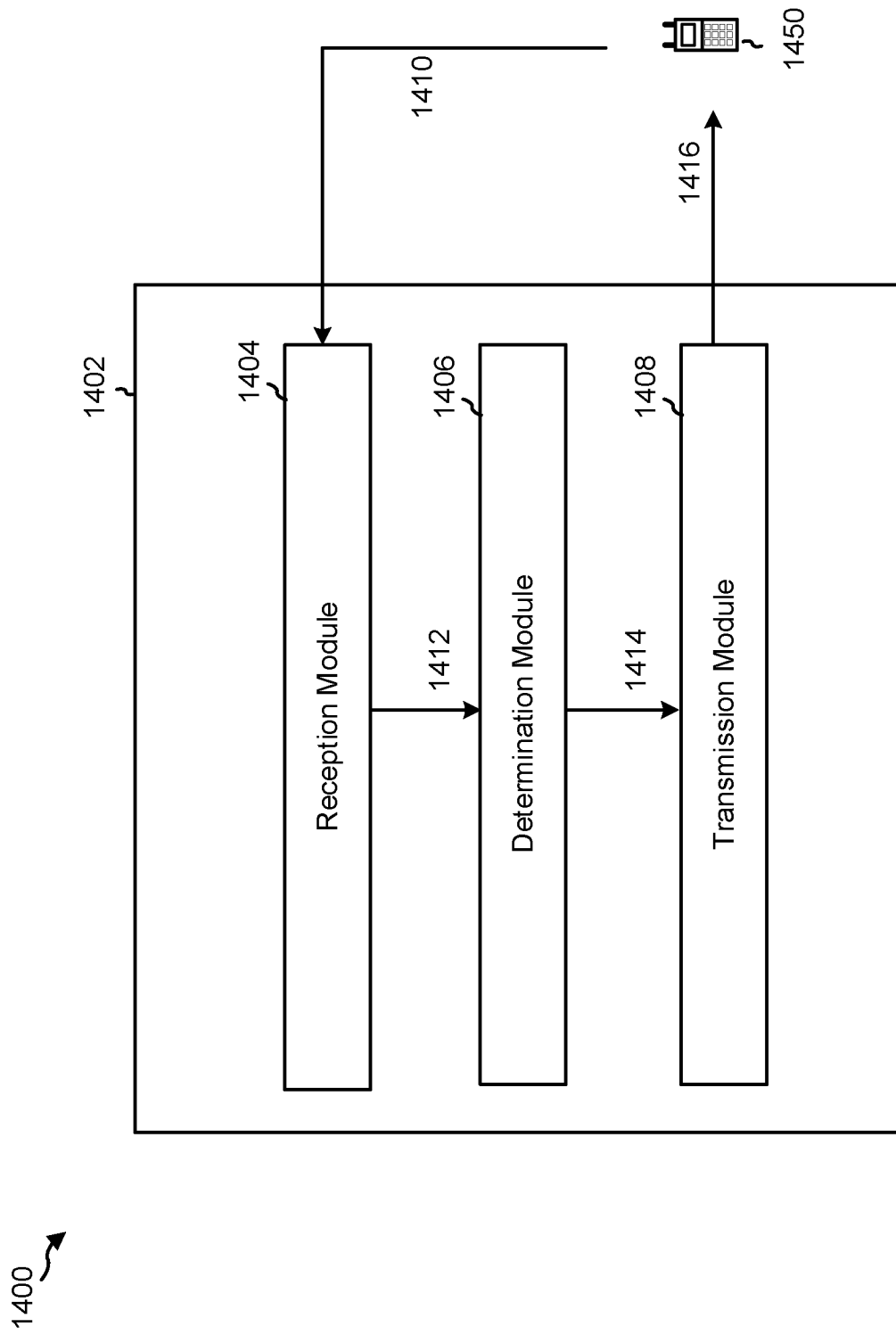
FIG. 14 is a conceptual data flow diagram illustrating the data flow between different modules/means/components in an example apparatus.

FIG. 14 is a conceptual data flow diagram 1400 illustrating the data flow between different modules/means/components in an example apparatus 1402. The apparatus 1402 may be a base station, such as an eNB, a gNB, and/or the like. In some aspects, the apparatus 1402 includes a reception module 1404, a determination module 1406, and a transmission module 1408.

The reception module 1404 may receive signals 1410 from a UE 1450 (e.g., the UE 120 and/or the like). In some aspects, the signals 1410 may identify a capability of the UE 1450. The reception module may provide data 1412 to the determination module 1406. In some aspects, the data 1412 may identify the capability. In some aspects, the signals 1410 and/or the data 1412 may indicate whether the UE has determined to monitor for or detect the wakeup signaling. For example, the signals 1410 and/or the data 1412 may indicate that the UE is going to monitor for or or detect the wakeup signaling, or may indicate that the UE is not going to monitor for or detect the wakeup signaling. In some aspects, the signals 1410 and/or the data 1412 may identify a minimum or required delay of one or more UEs.

The determination module 1406 may determine a configuration for the wakeup signal based at least in part on the data 1412. In some aspects, the determination module 1406 may determine a delay for transmission of the communication based at least in part on information identifying a minimum or required delay of one or more UEs. In some aspects, the determination module 1406 may determine a resource for the wakeup signal. The determination module 1406 may provide data 1414 to the transmission module 1408. For example, the data 1414 may indicate a resource for the wakeup signal, may identify the wakeup signal, may indicate that the transmission module 1408 is to generate and/or transmit the wakeup signal, and/or the like.

The transmission module 1408 may transmit a wakeup signal and/or a communication based at least in part on the wakeup signal. For example, the transmission module 1406 may generate a signal 1416, and the apparatus 1402 may transmit the signal 1416 to the UE 1450. The signal 1416 may include the wakeup signal, the communication, and/or other information, such as the configuration for the wakeup signal and/or the like.

The apparatus may include additional modules that perform each of the blocks of the algorithm in the aforementioned flow chart of FIG. 12. As such, each block in the aforementioned flow chart of FIG. 12 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 14 are provided as an example. In practice, there may be additional modules, fewer modules, different modules, or differently arranged modules than those shown in FIG. 14. Furthermore, two or more modules shown in FIG. 14 may be implemented within a single module, or a single module shown in FIG. 14 may be implemented as multiple, distributed modules. Additionally, or alternatively, a set of modules (e.g., one or more modules) shown in FIG. 14 may perform one or more functions described as being performed by another set of modules shown in FIG. 14.

Figure 15:
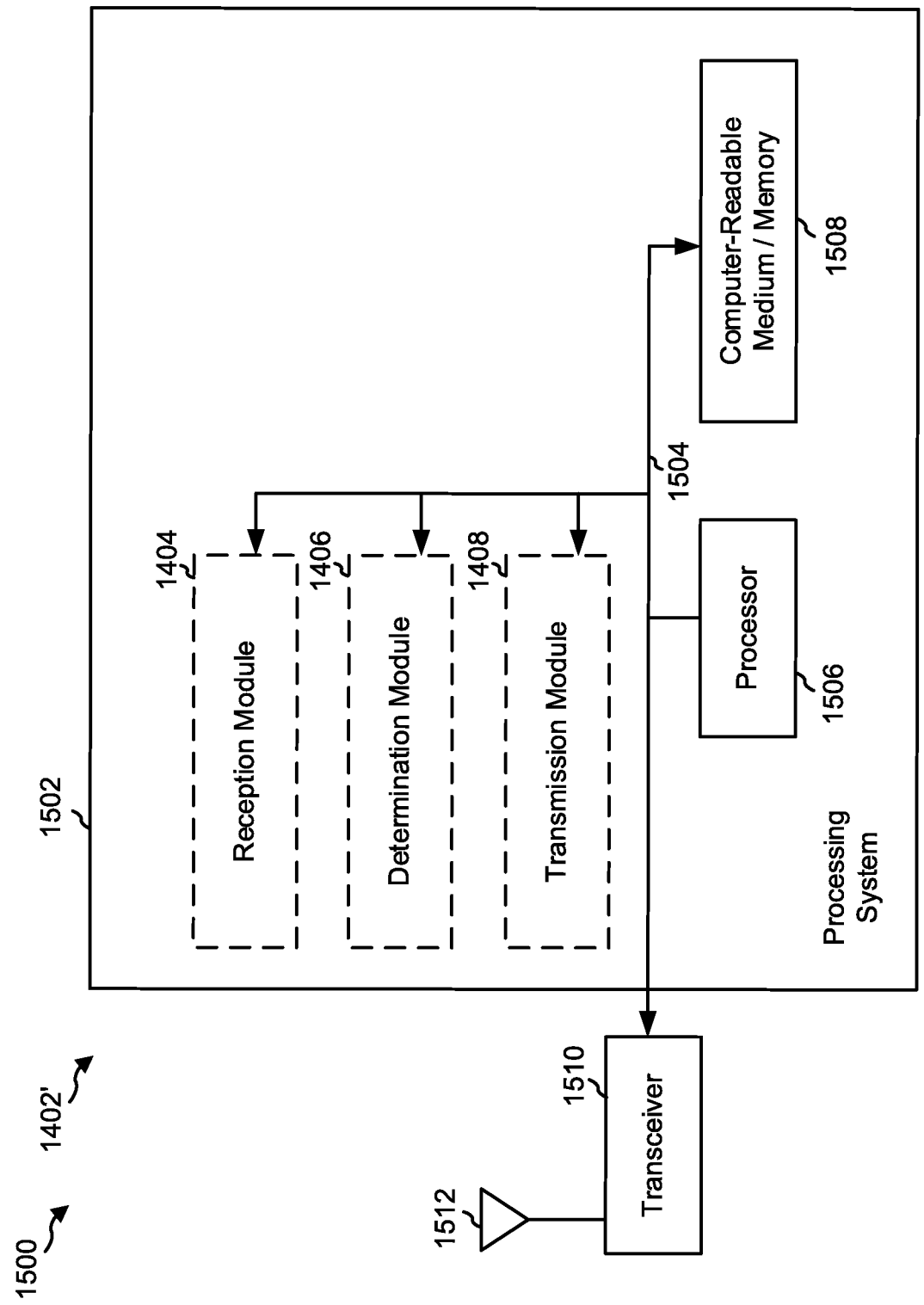
FIG. 15 is a diagram illustrating an example of a hardware implementation for an apparatus employing a processing system.

FIG. 15 is a diagram 1500 illustrating an example of a hardware implementation for an apparatus 1402' employing a processing system 1502. The apparatus 1402' may be a base station, such as an eNB, a gNB, and/or the like.

The processing system 1502 may be implemented with a bus architecture, represented generally by the bus 1504. The bus 1504 may include any number of interconnecting buses and bridges depending on the specific application of the processing system 1502 and the overall design constraints. The bus 1504 links together various circuits including one or more processors and/or hardware modules, represented by the processor 1506, the modules 1404, 1406, 1408 and the computer-readable medium/memory 1508. The bus 1504 may also link various other circuits such as timing sources, peripherals, voltage regulators, and power management circuits, which are well known in the art, and therefore, will not be described any further.

The processing system 1502 may be coupled to a transceiver 1510. The transceiver 1510 is coupled to one or more antennas 1512. The transceiver 1510 provides a means for communicating with various other apparatus over a transmission medium. The transceiver 1510 receives a signal from the one or more antennas 1512, extracts information from the received signal, and provides the extracted information to the processing system 1502, specifically the reception module 1404. In addition, the transceiver 1510 receives information from the processing system 1502, specifically the transmission module 1408, and based at least in part on the received information, generates a signal to be applied to the one or more antennas 1512. The processing system 1502 includes a processor 1506 coupled to a computer-readable medium/memory 1508. The processor 1506 is responsible for general processing, including the execution of software stored on the computer-readable medium/memory 1508. The software, when executed by the processor 1506, causes the processing system 1502 to perform the various functions described supra for any particular apparatus. The computer-readable medium/memory 1508 may also be used for storing data that is manipulated by the processor 1506 when executing software. The processing system further includes at least one of the modules 1404 and 1406. The modules may be software modules running in the processor 1506, resident/stored in the computer-readable medium/memory 1508, one or more hardware modules coupled to the processor 1506, or some combination thereof. The processing system 1502 may be a component of the BS 110 and may include the memory 242 and/or at least one of the TX MIMO processor 230, the receive processor 238, and/or the controller/processor 240.

In some aspects, the apparatus 1402/1402' for wireless communication includes means for transmitting a wakeup signal, means for transmitting a communication based at least in part on the wakeup signal, and/or the like. The aforementioned means may be one or more of the aforementioned modules of the apparatus 1402 and/or the processing system 1502 of the apparatus 1402' configured to perform the functions recited by the aforementioned means. As described supra, the processing system 1502 may include the TX MIMO processor 230, the receive processor 238, and/or the controller/processor 240. As such, in one configuration, the aforementioned means may be the TX MIMO processor 230, the receive processor 238, and/or the controller/processor 240 configured to perform the functions recited by the aforementioned means.

FIG. 15 is provided as an example. Other examples are possible and may differ from what was described in connection with FIG. 15.

Figure 16:
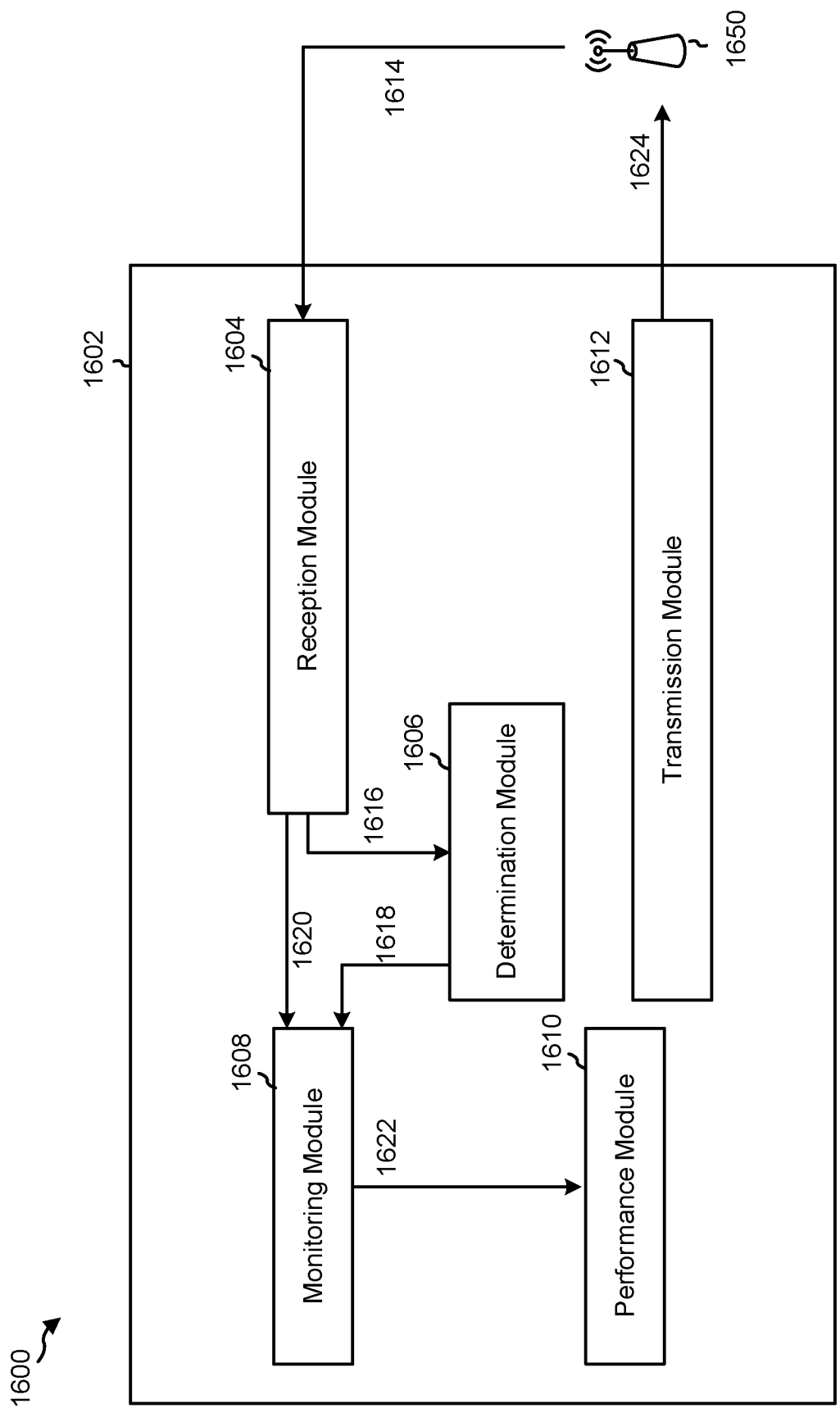
FIG. 16 is a conceptual data flow diagram illustrating the data flow between different modules/means/components in an example apparatus.

FIG. 16 is a conceptual data flow diagram 1600 illustrating the data flow between different modules/means/components in an example apparatus 1602. The apparatus 1602 may be a UE. In some aspects, the apparatus 1602 includes a reception module 1604, a determination module 1606, a monitoring module 1608, a performance module 1610, and/or a transmission module 1612.

The reception module 1604 may receive signals 1614 from a BS 1650. In some aspects, the signals 1614 may include a wakeup signal and/or a communication associated with the wakeup signal. In some aspects, the signals 1614 may include information relating to a wakeup signal configuration, or may include the wakeup signal configuration. The reception module 1604 may process the signals 1614 and may provide data 1616 to the determination module 1606 and/or data 1620 to the monitoring module 1608.

The determination module 1606 may determine whether the apparatus 1602 is to monitor for the wakeup signaling. For example, the determination module 1606 may determine whether a configured delay or gap (identified by the data 1616) is within the confines of a required delay or gap of the apparatus 1602. The determination module 1606 may provide data 1618 to the monitoring module 1608 indicating whether the UE is to monitor for the wakeup signaling.

The monitoring module 1608 may monitor a resource for wakeup signaling. For example, the monitoring module 1608 may process the data 1620 to identify a wakeup signal. In some aspects, the monitoring module 1608 may process the data 1620 based at least in part on the data 1618, which may indicate whether to monitor for the wakeup signal. The monitoring module 1608 may provide data 1622 to the performance module 1612. The data 1622 may identify the wakeup signal and/or one or more parameters associated with the wakeup signal, such as a power level and/or the like.

The performance module 1610 may perform a synchronization procedure based at least in part on the data 1622. For example, the performance module 1610 may perform the synchronization procedure based at least in part on the wakeup signal and/or the one or more parameters associated with the wakeup signal. In some aspects, the performance module 1610 may perform a wakeup (or may cause the apparatus 1602 to perform a wakeup) to receive the communication based at least in part on the data 1622. In some aspects, the performance module 1610 may cause the reception module 1604 to wake up, to monitor for the communication, to receive the communication, and/or the like.

The transmission module 1614 may transmit signals 1624. In some aspects, the signals 1624 may identify a capability of the apparatus 1602. In some aspects, the signals 1624 may identify a required delay or gap of the apparatus 1602. In some aspects, the signals 1624 may indicate whether the apparatus 1602 is to monitor for wakeup signaling.

The apparatus may include additional modules that perform each of the blocks of the algorithm in the aforementioned flow chart of FIG. 13. As such, each block in the aforementioned flow chart of FIG. 13 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

The number and arrangement of modules shown in FIG. 16 are provided as an example. In practice, there may be additional modules, fewer modules, different modules, or differently arranged modules than those shown in FIG. 16. Furthermore, two or more modules shown in FIG. 16 may be implemented within a single module, or a single module shown in FIG. 16 may be implemented as multiple, distributed modules. Additionally, or alternatively, a set of modules (e.g., one or more modules) shown in FIG. 16 may perform one or more functions described as being performed by another set of modules shown in FIG. 16.

Figure 17:
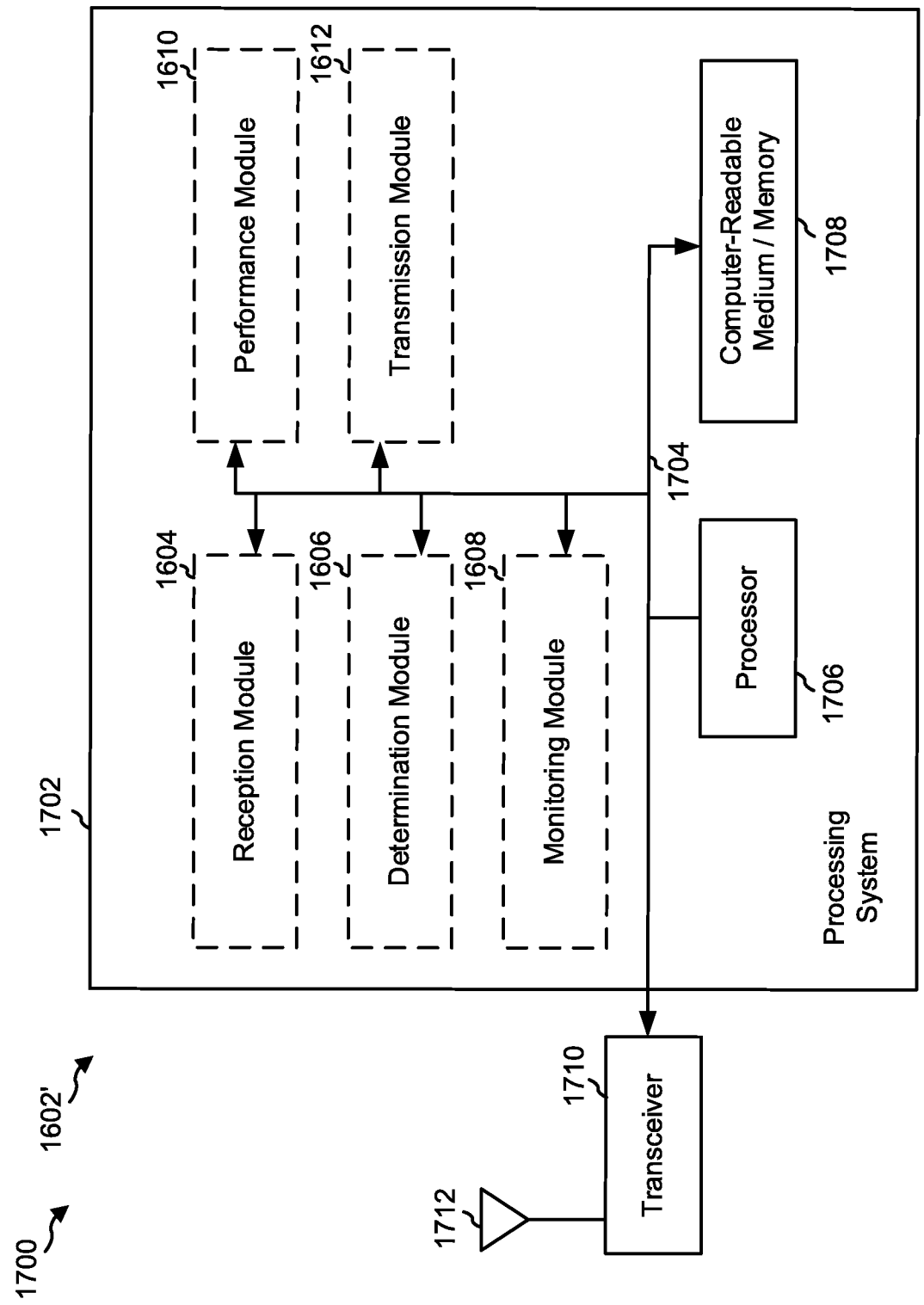
FIG. 17 is a diagram illustrating an example of a hardware implementation for an apparatus employing a processing system.

FIG. 17 is a diagram 1700 illustrating an example of a hardware implementation for an apparatus 1602' employing a processing system 1702. The apparatus 1602' may be a UE.

The processing system 1702 may be implemented with a bus architecture, represented generally by the bus 1704. The bus 1704 may include any number of interconnecting buses and bridges depending on the specific application of the processing system 1702 and the overall design constraints. The bus 1704 links together various circuits including one or more processors and/or hardware modules, represented by the processor 1706, the modules 1604, 1606, 1608, 1610, 1612, and the computer-readable medium/memory 1708. The bus 1704 may also link various other circuits such as timing sources, peripherals, voltage regulators, and power management circuits, which are well known in the art, and therefore, will not be described any further.

The processing system 1702 may be coupled to a transceiver 1710. The transceiver 1710 is coupled to one or more antennas 1712. The transceiver 1710 provides a means for communicating with various other apparatus over a transmission medium. The transceiver 1710 receives a signal from the one or more antennas 1712, extracts information from the received signal, and provides the extracted information to the processing system 1702, specifically the reception module 1604. In addition, the transceiver 1710 receives information from the processing system 1702, specifically the transmission module 1612 and based at least in part on the received information, generates a signal to be applied to the one or more antennas 1712. The processing system 1702 includes a processor 1706 coupled to a computer-readable medium/memory 1708. The processor 1706 is responsible for general processing, including the execution of software stored on the computer-readable medium/ memory 1708. The software, when executed by the processor 1706, causes the processing system 1702 to perform the various functions described supra for any particular apparatus. The computer-readable medium/memory 1708 may also be used for storing data that is manipulated by the processor 1706 when executing software. The processing system further includes at least one of the modules 1604, 1606, 1608, 1610, and 1612. The modules may be software modules running in the processor 1706, resident/stored in the computer-readable medium/memory 1708, one or more hardware modules coupled to the processor 1706, or some combination thereof. The processing system 1702 may be a component of the UE 120 and may include the memory 282 and/or at least one of the TX MIMO processor 266, the RX processor 258, and/or the controller/processor 280.

In some aspects, the apparatus 1602/1602' for wireless communication includes means for monitoring for wakeup signaling in a resource based at least in part on a wakeup signal configuration, wherein the wakeup signal configuration is based at least in part on a capability of the apparatus 1602/1602'; means for receiving a wakeup signal in the resource; and means for receiving a communication based at least in part on the wakeup signal; means for performing a wakeup to receive the communication based at least in part on the wakeup signal; means for transmitting information to a base station identifying the capability; means for monitoring for the communication between the wakeup signal and a time associated with the configured delay; means for determining or selecting whether to monitor for the wakeup signaling based at least in part on a delay or gap configured by a base station; means for providing, by the apparatus 1602/1602', information indicating whether the apparatus 1602/1602' is to monitor for the wakeup signaling; means for performing a synchronization procedure using the wakeup signal within a configured period of at least one discontinuous reception cycle; and/or means for providing, by the apparatus 1602/1602', information identifying a required delay or gap, wherein the required delay or gap is one of a plurality of candidate delays or gaps. The aforementioned means may be one or more of the aforementioned modules of the apparatus 1602 and/or the processing system 1702 of the apparatus 1602' configured to perform the functions recited by the aforementioned means. As described supra, the processing system 1702 may include the TX MIMO processor 266, the RX processor 258, and/or the controller/processor 280. As such, in one configuration, the aforementioned means may be the TX MIMO processor 266, the RX processor 258, and/or the controller/processor 280 configured to perform the functions recited by the aforementioned means.

FIG. 17 is provided as an example. Other examples are possible and may differ from what was described in connection with FIG. 17.

It is understood that the specific order or hierarchy of blocks in the processes/flow charts disclosed is an illustration of example approaches. Based upon design preferences, it is understood that the specific order or hierarchy of blocks in the processes/flow charts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication performed by a base station, comprising:
    transmitting a wakeup signal using a resource selected from one of:
        one or more first resources of a first resource pattern, or
        one or more second resources of a second resource pattern,
            wherein the resource is selected from the one or more first resources or the one or more second resources based at least in part on whether the wakeup signal is for a user equipment (UE) associated with a first UE group or a second UE group,
            wherein the one or more first resources are in a first set of subframes and the one or more second resources are in a second set of subframes, and
            wherein the wakeup signal indicates for the UE to be in an active mode; and
    transmitting a communication to the UE based at least in part on the wakeup signal.

2. The method of claim 1, wherein the one or more first resources alternate with the one or more second resources in a time domain.

3. The method of claim 1, wherein the first resource pattern is associated with a first antenna port and the second resource pattern is associated with a second antenna port.

4. The method of claim 1, wherein the wakeup signal is transmitted using a different antenna port than a synchronization signal or reference signal for the UE.

5. The method of claim 1, wherein the wakeup signal is transmitted using a same antenna port within at least a single subframe.

6. The method of claim 1, wherein a number of the one or more first resources or a number of the one or more second resources is configurable or predefined.

7. The method of claim 1, wherein the one or more first resources and the one or more second resources comprise physical resource blocks.

8. The method of claim 1, wherein the one or more first resources alternate with the one or more second resources in a frequency domain.

9. The method of claim 1, wherein resources of the one or more first resources or the one or more second resources vary in a time domain and a frequency domain.

10. The method of claim 1, wherein a preamble of the wakeup signal identifies a UE group, of the first UE group and the second UE group, with which the wakeup signal is associated.

11. The method of claim 1, wherein a preamble of the wakeup signal identifies a cell with which the UE is associated.

12. The method of claim 1, wherein configuration information identifying the first UE group and the second UE group is provided in system information.

13. The method of claim 1, wherein a transmission power of the wakeup signal is configured based at least in part on a power offset relative to a downlink reference signal transmitted by the base station.

14. The method of claim 1, wherein a UE group, of the first UE group and the second UE group, is assigned to the UE based at least in part on a paging narrowband of the UE.

15. A method of wireless communication performed by a user equipment (UE), comprising:
monitoring a particular resource of a resource pattern for wakeup signaling associated with a UE group that includes the UE, wherein the resource pattern is associated with the UE group, and wherein the particular resource is in a set of subframes; and
receiving a wakeup signal, wherein the wakeup signal corresponds to at least one of a cell identifier or UE group identifier associated with the UE, wherein at least a portion of the cell identifier or a portion of the UE group identifier is indicated by the wakeup signal, and wherein the UE operates in an active state over resource corresponding to the portion of the cell identifier or the portion of the UE group identifier indicated by the wakeup signal.

16. The method of claim 15, wherein the portion of the UE group identifier is indicated by a preamble of the wakeup signal.

17. The method of claim 15, wherein configuration information, indicating that the UE is associated with the UE group, is received by the UE in system information.

18. The method of claim 15, wherein the UE group is assigned to the UE based at least in part on parameters of a paging narrowband of the UE and at least in part on a number of UE groups.

19. The method of claim 15, wherein the UE is configured to determine the UE group based at least in part on a total number of UE groups, wherein the UE identifies the total number of UE groups based at least in part on system information or configuration information.

20. The method of claim 15, wherein the UE group is configured or defined before the wakeup signal is detected.

21. The method of claim 15, wherein the wakeup signal is received further based at least in part on a parameter of a preamble of the wakeup signal, wherein the UE is configured to detect the parameter of the preamble.

22. The method of claim 15, further comprising:
performing a wakeup to receive a communication based at least in part on receiving the wakeup signal; and
receiving the communication.

23. The method of claim 15, wherein the resource pattern is associated with an antenna port.

24. A base station for wireless communication, comprising:
a memory; and
one or more processors operatively coupled to the memory, the memory and the one or more processors configured to:
transmit a wakeup signal using a resource selected from one of:
one or more first resources of a first resource pattern, or
one or more second resources of a second resource pattern,
wherein the resource is selected from the one or more first resources or the one or more second resources based at least in part on whether the wakeup signal is for a user equipment (UE) associated with a first UE group or a second UE group,
wherein the one or more first resources are in a first set of subframes and the one or more second resources are in a second set of subframes, and
wherein the wakeup signal indicates for the UE to be in an active mode; and
transmit a communication to the UE based at least in part on the wakeup signal.

25. The base station of claim 24, wherein the one or more first resources alternate with the one or more second resources in a time domain.

26. The base station of claim 24, wherein the first resource pattern is associated with a first antenna port and the second resource pattern is associated with a second antenna port.

27. The base station of claim 24, wherein the wakeup signal is transmitted using a different antenna port than a synchronization signal or reference signal for the UE.

28. The base station of claim 24, wherein the wakeup signal is transmitted using a same antenna port within at least a single subframe.

29. The base station of claim 24, wherein a number of the one or more first resources or a number of the one or more second resources is configurable or predefined.

30. The base station of claim 24, wherein the one or more first resources and the one or more second resources comprise physical resource blocks.

31. The base station of claim 24, wherein the one or more first resources alternate with the one or more second resources in a frequency domain.

32. The base station of claim 24, wherein resources of the one or more first resources or the one or more second resources vary in a time domain and a frequency domain.

33. The base station of claim 24, wherein a preamble of the wakeup signal identifies a UE group, of the first UE group and the second UE group, with which the wakeup signal is associated.

34. The base station of claim 24, wherein a preamble of the wakeup signal identifies a cell with which the UE is associated.

35. The base station of claim 24, wherein configuration information identifying the first UE group and the second UE group is provided in system information.

36. The base station of claim 24, wherein a transmission power of the wakeup signal is configured based at least in part on a power offset relative to a downlink reference signal transmitted by the base station.

37. The base station of claim 24, wherein a UE group, of the first UE group and the second UE group, is assigned to the UE based at least in part on a paging narrowband of the UE.

38. A user equipment (UE) for wireless communication, comprising:
a memory; and
one or more processors operatively coupled to the memory, the memory and the one or more processors configured to:
monitor a particular resource of a resource pattern for wakeup signaling that is associated with a UE group that includes the UE, wherein the resource pattern is associated with the UE group, and wherein the particular resource is in a set of subframes; and
receiving a wakeup signal, wherein the wakeup signal corresponds to at least one of a cell identifier or UE group identifier associated with the UE, wherein at least a portion of the cell identifier or a portion of the UE group identifier is indicated by the wakeup signal, and wherein the UE operates in an active state over resource corresponding to the portion of the cell identifier or the portion of the UE group identifier indicated by the wakeup signal.

39. The UE of claim 38, wherein the portion of the UE group identifier is indicated by a preamble of the wakeup signal.

40. The UE of claim 38, wherein configuration information, indicating that the UE is associated with the UE group, is received by the UE in system information.

41. The UE of claim 38, wherein the UE group is assigned to the UE based at least in part on parameters of a paging narrowband of the UE and at least in part on a number of UE groups.

42. The UE of claim 38, wherein the UE is configured to determine the UE group based at least in part on a total number of UE groups, wherein the UE identifies the total number of UE groups based at least in part on system information or configuration information.

43. The UE of claim 38, wherein the UE group is configured or defined before the wakeup signal is detected.

44. The UE of claim 38, wherein the wakeup signal is received further based at least in part on a parameter of a preamble of the wakeup signal, wherein the UE is configured to detect the parameter of the preamble.

45. The UE of claim 38, wherein the one or more processors are further configured to:
perform a wakeup to receive a communication based at least in part on identifying the wakeup signal; and
receive the communication.

46. The UE of claim 38, wherein the resource pattern is associated with an antenna port.

* * * * *